US010730537B2

(12) United States Patent
Kono et al.

(10) Patent No.: US 10,730,537 B2
(45) Date of Patent: Aug. 4, 2020

(54) ANOMALY DETERMINATION DEVICE, ANOMALY DETERMINATION METHOD, AND PROGRAM

(71) Applicant: MITSUBISHI HEAVY INDUSTRIES ENGINEERING, LTD., Yokohama-shi, Kanagawa (JP)

(72) Inventors: Hiroyuki Kono, Tokyo (JP); Yukihide Yanobu, Tokyo (JP); Takeshi Kora, Tokyo (JP); Eisuke Okano, Tokyo (JP)

(73) Assignee: MITSUBISHI HEAVY INDUSTRIES ENGINEERING, LTD., Yokohama-Shi, Kanagawa (JP)

( * ) Notice: Subject to any disclaimer, the term of this patent is extended or adjusted under 35 U.S.C. 154(b) by 100 days.

(21) Appl. No.: 16/078,389

(22) PCT Filed: Jan. 31, 2017

(86) PCT No.: PCT/JP2017/003370
§ 371 (c)(1),
(2) Date: Aug. 21, 2018

(87) PCT Pub. No.: WO2017/145665
PCT Pub. Date: Aug. 31, 2017

(65) Prior Publication Data
US 2019/0054939 A1 Feb. 21, 2019

(30) Foreign Application Priority Data

Feb. 26, 2016 (JP) .................................. 2016-035885

(51) Int. Cl.
*G01M 17/08* (2006.01)
*B61L 23/04* (2006.01)
(Continued)

(52) U.S. Cl.
CPC ............... *B61L 23/042* (2013.01); *B61L 5/06* (2013.01); *B61L 5/102* (2013.01); *B61L 23/002* (2013.01); *E01B 7/00* (2013.01); *G01M 17/08* (2013.01)

(58) Field of Classification Search
USPC .......................................................... 73/146
See application file for complete search history.

(56) References Cited

U.S. PATENT DOCUMENTS 3,253,140 A * 5/1966 Sibley ...................... B61K 9/06
246/169 D
3,333,096 A * 7/1967 Ohman .................. B61L 29/286
246/34 CT (Continued)

FOREIGN PATENT DOCUMENTS

JP H04-056675 A 2/1992
JP H08-268282 A 10/1996

(Continued)

OTHER PUBLICATIONS

PCT/ISA/210, "International Search Report for International Application No. PCT/JP2017/003370," dated May 16, 2017.

(Continued)

*Primary Examiner* — Andre J Allen
(74) *Attorney, Agent, or Firm* — Manabu Kanesaka; Benjamin Hauptman; Kenneth Berner

(57) ABSTRACT

An anomaly determination device includes a changeover force measurement unit that measures a changeover force output by a driving device, the driving device outputting a changeover force for switching a direction of a branch rail whose direction is variable, a voltage measurement unit that measures a voltage supplied to the driving device, a current measurement unit that measures a current flowing through the driving device, and an anomaly determination unit that determines whether or not there is an anomaly in the branch (Continued)

rail, there is an anomaly in the driving device, and there is an anomaly in power supplied to the driving device on the basis of the magnitude of the changeover force, the magnitude of the voltage, and the magnitude of the current.

7 Claims, 13 Drawing Sheets

(51) Int. Cl.
  *B61L 5/06* (2006.01)
  *B61L 5/10* (2006.01)
  *B61L 23/00* (2006.01)
  *E01B 7/00* (2006.01)

(56) References Cited

U.S. PATENT DOCUMENTS

| | | | |
|---|---|---|---|
| 3,450,874 A * | 6/1969 | Whitten | B61L 1/187 |
| | | | 246/34 CT |
| 5,136,218 A * | 8/1992 | Pessina | B60L 3/12 |
| | | | 318/139 |
| 6,125,311 A * | 9/2000 | Lo | B61L 27/0088 |
| | | | 701/19 |
| 6,779,761 B2 * | 8/2004 | Holgate | B61L 23/044 |
| | | | 246/122 R |

FOREIGN PATENT DOCUMENTS

| | | |
|---|---|---|
| JP | H10-129483 A | 5/1998 |
| JP | 3020268 B2 | 3/2000 |
| JP | 2004-034876 A | 2/2004 |
| JP | 2010-137686 A | 6/2010 |
| JP | 4974234 B2 | 7/2012 |
| JP | 5003981 B2 | 8/2012 |
| JP | 5334187 B2 | 11/2013 |
| JP | 5343294 B2 | 11/2013 |

OTHER PUBLICATIONS

PCT/ISA/237, "Written Opinion of the International Searching Authority for International Application No. PCT/JP2017/003370," dated May 16, 2017.

* cited by examiner

FIG. 10

| MEASUREMENT ITEM | ANOMALY | CAUSE | ANOMALY OCCURRENCE PLACE |
|---|---|---|---|
| DISPLACEMENT (DISPLACEMENT MEASUREMENT UNIT) | PREDETERMINED AMOUNT OF DISPLACEMENT NOT DETECTED | VARIABLE BRANCH RAIL STRAINED WITH FOREIGN OBJECT | |
| | AMOUNTS OF LEFT AND RIGHT DISPLACEMENTS ARE DIFFERENT | LOOSE ENGAGEMENT BETWEEN VARIABLE BRANCH RAIL AND ROD | VARIABLE BRANCH RAIL |
| | DISPLACEMENT OFFSET GENERATION | DEFORMATION OF VARIABLE BRANCH RAIL OR ROD | |
| SWITCHING SPEED (CALCULATED FROM DISPLACEMENT) | DECREASE IN SWITCHING SPEED | VARIABLE BRANCH RAIL BEING STIFF DUE TO RUST, FREEZING, OR THE LIKE | |
| CHANGEOVER FORCE (CHANGEOVER FORCE MEASUREMENT UNIT) | INCREASE IN CHANGEOVER FORCE (RESISTANCE) | VARIABLE BRANCH RAIL BEING STIFF DUE TO RUST, FREEZING, OR THE LIKE | |
| VOLTAGE (VOLTAGE MEASUREMENT UNIT) | DECREASE IN VOLTAGE, OR OVERVOLTAGE | FAILURE OF POWER SUPPLY | POWER SUPPLY |
| CURRENT (CURRENT MEASUREMENT UNIT) | DECREASE IN CURRENT | FAILURE OF DRIVING DEVICE (DISCONNECTION, CONTACT FAILURE, OR THE LIKE) | DRIVING DEVICE |
| | DECREASE IN CURRENT, OR OVERCURRENT | FAILURE OF POWER SUPPLY | POWER SUPPLY |
| DRIVING DEVICE TEMPERATURE (DRIVING DEVICE TEMPERATURE MEASUREMENT UNIT) | ABNORMAL GENERATION OF HEAT | SIGN OF FAILURE OF DRIVING DEVICE | DRIVING DEVICE |
| | | BURNOUT OF DRIVING DEVICE | |
| ENVIRONMENTAL TEMPERATURE (ENVIRONMENTAL TEMPERATURE MEASUREMENT UNIT) | TEMPERATURE DROP | USED FOR DETERMINATION AS TO FREEZING | (VARIABLE BRANCH RAIL) |

ANOMALY DETERMINATION DEVICE, ANOMALY DETERMINATION METHOD, AND PROGRAM

TECHNICAL FIELD

The present invention relates to an anomaly determination device, an anomaly determination method, and a program.

Priority is claimed on Japanese Patent Application No. 2016-035885, filed Feb. 26, 2016, the content of which is incorporated herein by reference.

BACKGROUND ART

In a transportation system in which switching between tracks is performed, such as a railroad, a new transportation system, or the like, it is important for the switching between tracks to be correctly performed in order to ensure safety and the accuracy of a schedule. Therefore, several technologies for detecting failure of a switching portion of a track are proposed.

For example, a state monitoring device for a switch described in Patent Literature 1 monitors distortion of a switch adjuster, converts a detected value of the distortion into a changeover force, and outputs or displays the changeover force. Further, Patent Literature 1 describes that state monitoring is performed through comparison of the output or displayed changeover force with a reference changeover force measured in advance when the switch is normal.

CITATION LIST

Patent Literature

[Patent Literature 1] Japanese Patent No. 5343294

SUMMARY OF INVENTION

Technical Problem

When a failure has occurred in a switching portion of a track, it is important to rapidly recognize a failure occurrence place in order to rapidly resolve the failure. In the case of a transportation system, the number of devices to be used is large, and the devices are installed over a wide area. Therefore, it is particularly important that it be possible to rapidly recognize a failure occurrence place in the transportation system.

The present invention provides an anomaly determination device, an anomaly determination method, and a program that are capable of obtaining information for recognizing a failure occurrence place when a failure occurs in a switching portion of a track.

Solution to Problem

According to a first aspect of the present invention, an anomaly determination device includes: a changeover force measurement unit that measures a changeover force output by a driving device, the driving device outputting a changeover force for switching a direction of a branch rail whose direction is variable; a voltage measurement unit that measures a voltage supplied to the driving device; a current measurement unit that measures a current flowing through the driving device; and an anomaly determination unit that determines whether there is an anomaly in the branch rail, whether there is an anomaly in the driving device, and whether there is an anomaly in power supplied to the driving device on the basis of the magnitude of the changeover force, the magnitude of the voltage, and the magnitude of the current.

The anomaly determination device may further include a displacement measurement unit that measures displacements of the branch rails provided on left and right sides of a travel route of a vehicle along the travel route, for the respective left and right branch rails, wherein the anomaly determination unit determines whether there is an anomaly in the branch rails on the basis of a difference between a displacement of the left branch rail and a displacement of the right branch rail.

The anomaly determination unit may determine whether there is an anomaly on the basis of a temporal change in at least one of the magnitude of the changeover force, the magnitude of the voltage, and the magnitude of the current.

According to a second aspect of the present invention, an anomaly determination method includes: measuring a changeover force output by a driving device, the driving device outputting a changeover force for switching a direction of a branch rail whose direction is variable; measuring a voltage supplied to the driving device; measuring a current flowing through the driving device; and determining whether there is an anomaly in the branch rail, whether there is an anomaly in the driving device, and whether there is an anomaly in power supplied to the driving device on the basis of the magnitude of the changeover force, the magnitude of the voltage, and the magnitude of the current.

According to a third aspect of the present invention, a program is a program for causing a computer to determine whether there is an anomaly in a branch rail, whether there is an anomaly in a driving device, and whether there is an anomaly in power supplied to the driving device on the basis of the magnitude of a changeover force output by a driving device, the driving device outputting a changeover force for switching a direction of a branch rail whose direction is variable, the magnitude of a voltage supplied to the driving device, and the magnitude of a current flowing through the driving device.

Advantageous Effects of Invention

According to the anomaly determination device, the anomaly determination method, and the program described above, it is possible to obtain information for recognizing where a failure has occurred when a failure occurs in the switching portion of the track.

BRIEF DESCRIPTION OF DRAWINGS

FIG. 10 is an illustrative diagram showing an example of an anomaly and a point at which the anomaly occurs determined by the anomaly determination unit according to the embodiment of the present invention.

EMBODIMENTS FOR CARRYING OUT THE INVENTION

Hereinafter, embodiments of the present invention will be described, but the following embodiments do not limit the invention according to the Claims. Further, not all combinations of the features described in the embodiments are necessarily essential to solution means of the invention.

Figure 1:
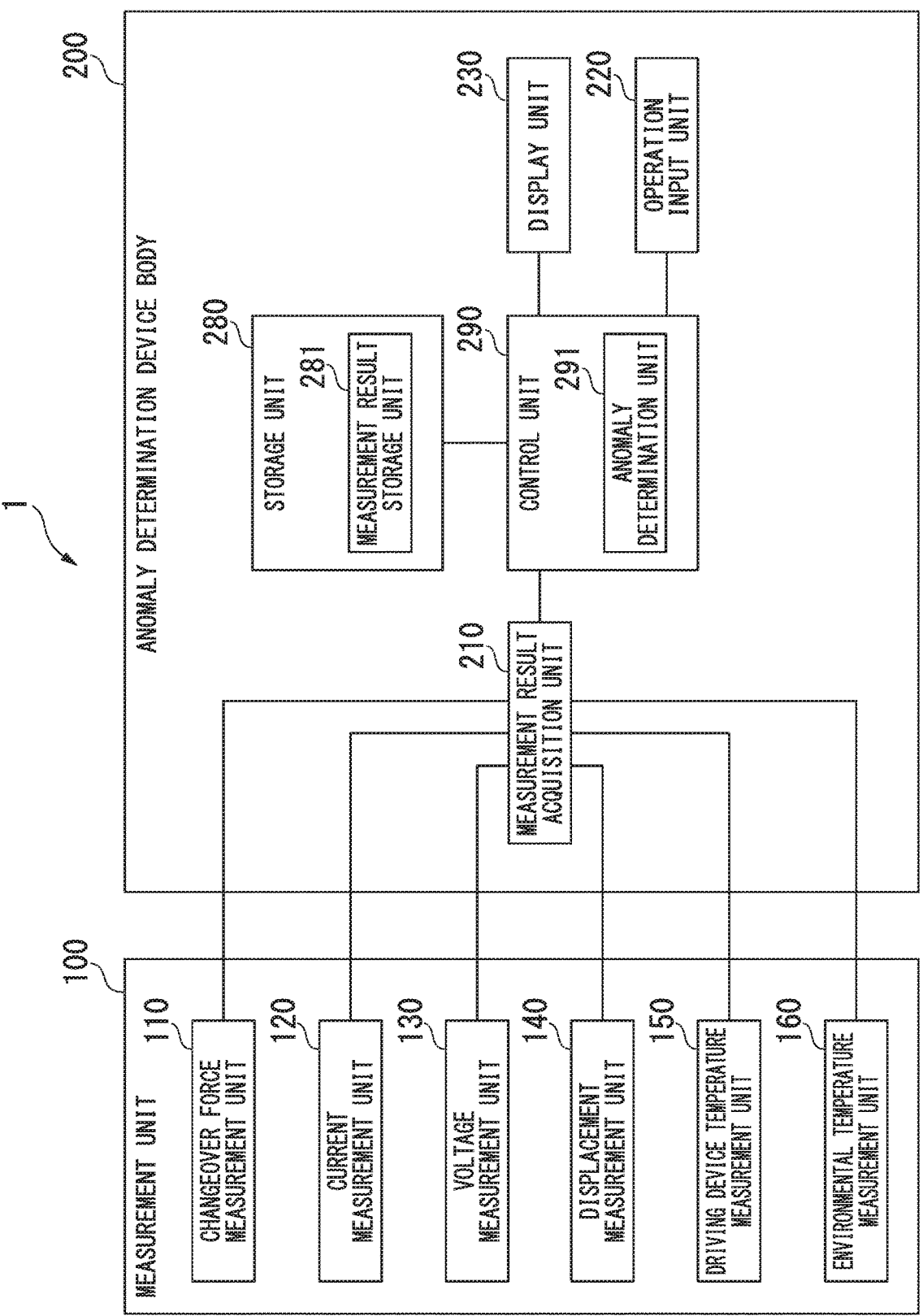
FIG. 1 is a schematic block diagram showing a functional configuration of an anomaly determination device according to an embodiment of the present invention.

FIG. 1 is a schematic block diagram showing a functional configuration of an anomaly determination device according to an embodiment of the present invention. As shown in FIG. 1, the anomaly determination device 1 includes a measurement unit 100 and an anomaly determination device body 200. The measurement unit 100 includes a changeover force measurement unit 110, a current measurement unit 120, a voltage measurement unit 130, a displacement measurement unit 140, a driving device temperature measurement unit 150, and an environmental temperature measurement unit 160. The anomaly determination device body 200 includes a measurement result acquisition unit 210, an operation input unit 220, a display unit 230, a storage unit 280, and a control unit 290. The storage unit 280 includes a measurement result storage unit 281. The control unit 290 includes an anomaly determination unit 291.

The anomaly determination device 1 determines whether or not there is an anomaly in a branching device. The branching device described herein is, for example, an electric device that is used in a guide rail type railway (Automated Guideway Transit; AGT) which is a new transportation system and switches directions of a branch rail.

However, the branching device targeted by the anomaly determination device 1 is not limited to the branching device of a new transportation system. It is possible to use the anomaly determination device 1 for monitoring of an electric branching device that is used for any of various transportation systems which switch traveling routes of a vehicle by switching directions of a branch rail.

The switching of the branch rail that is performed by the branching device will be described herein with reference to FIGS. 2 to 5. Specifically, an example of a change in a direction of the branch rail by the branching device when a vehicle travels straight at a branch point of a track and when the vehicle turns left will be described.

Figure 2:
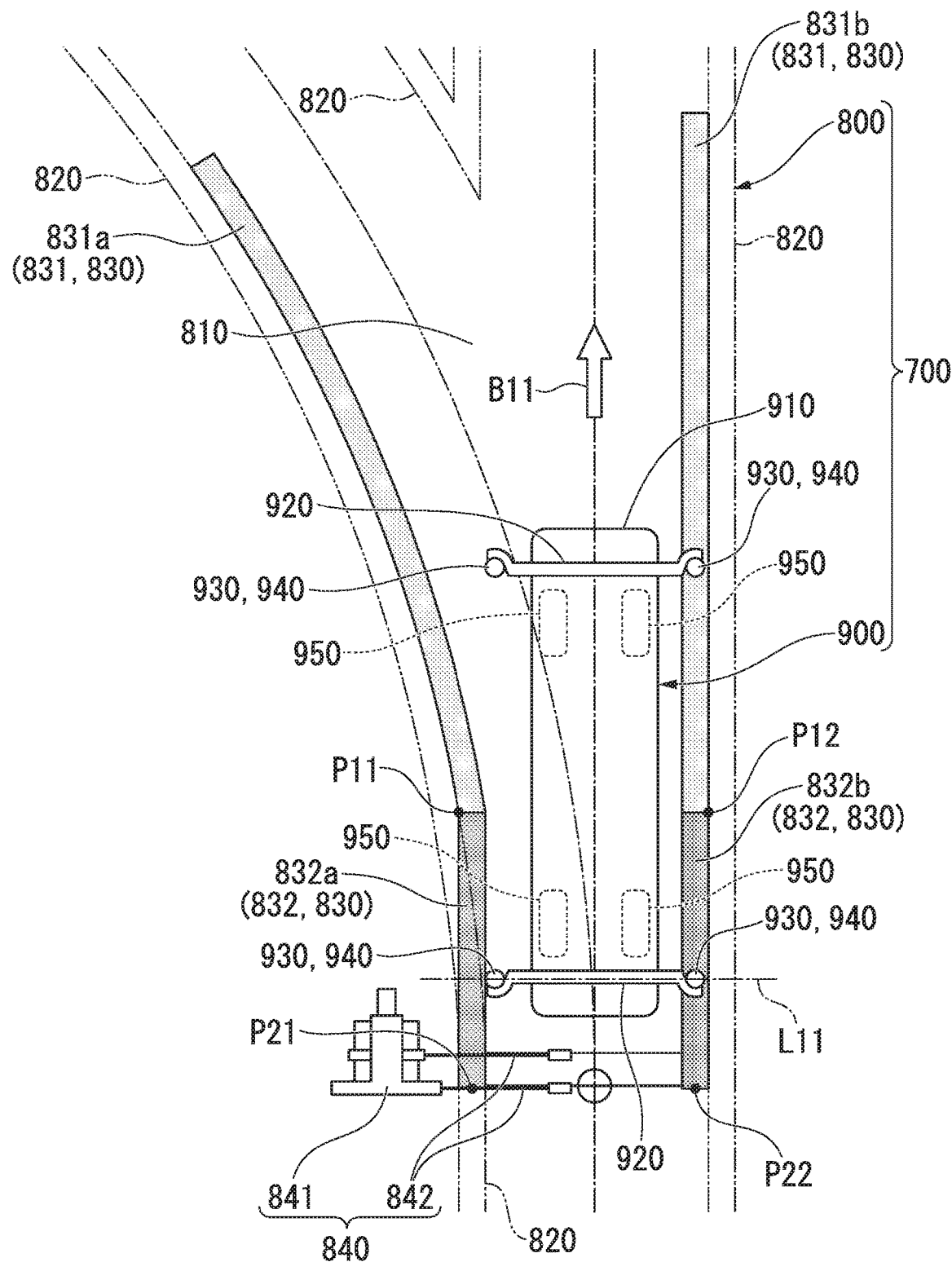
FIG. 2 is an illustrative diagram showing an example of a direction of a branch rail when a vehicle travels straight according to the embodiment of the present invention.

FIG. 2 is an illustrative diagram showing an example of a direction of the branch rail when the vehicle travels straight. FIG. 2 shows a state in which the vehicle traveling at a branch point of a track is viewed from above. "Above" described herein is the skyward side.

A new transportation system 700 shown in FIG. 2 includes a track 800 and a vehicle 900. The track 800 includes a road surface 810, a guide rail 820, a branch rail 830, and a branching device 840. The branch rail 830 includes a fixed branch rail 831 and a variable branch rail 832. The branching device 840 includes a driving device 841 and a rod 842. The vehicle 900 includes a vehicle body 910, a support 920, a guide wheel 930, a branch wheel 940, and a traveling tire 950.

Further, a traveling direction of the vehicle 900 is indicated by an arrow B11.

The track 800 constitutes a traveling path of the vehicle 900.

The road surface 810 is a surface on which the vehicle 900 travels. The road surface 810 is formed, for example, approximately horizontally on a surface of concrete. The vehicle 900 travels on the road surface 810 by rotating the traveling tire 950 that is in contact with the road surface 810.

The guide rail 820 restricts the direction of the vehicle 900 so that the vehicle 900 travels on the road surface 810. In the example of FIG. 2, the guide rail 820 is provided on both sides of the track 800, and the vehicle 900 travels with the guide wheel 930 in contact with the guide rail 820. "Both sides of the track 800" described herein refers to both sides of the road surface 810.

Accordingly, the direction of the vehicle 900 is restricted so that the vehicle 900 does not deviate from the road surface 810.

The branch rail 830 is provided at a branch point of the track 800 and guides the vehicle 900 traveling at the branch point to the track of any of branch destinations.

In the example of FIG. 2, the fixed branch rail 831 is installed at each branch destination of the track 800, and a variable branch rail 832 is installed in front of each fixed branch rail 831. Here, "front" is the rear side in the traveling direction of the vehicle 900.

Specifically, the fixed branch rail 831 is installed on the right side of the track of the branch destination when the vehicle 900 travels straight, and the variable branch rail 832 is installed in front of the fixed branch rail 831. The fixed branch rail 831 is installed on the left side of the track of the branch destination when the vehicle 900 turns left, and the variable branch rail 832 is installed in front of the fixed branch rail 831. "Right side of the track" described herein is the right side in the traveling direction of the vehicle 900. Here, "left side of the track" described herein is the left side in the traveling direction of the vehicle 900.

Hereinafter, the fixed branch rail 831 and the variable branch rail 832 located on the left side in the traveling direction of the vehicle 900 are referred to as a left fixed branch rail 831a and a left variable branch rail 832a, respectively. The fixed branch rail 831 and the variable branch rail 832 located on the right side in the traveling direction of the vehicle 900 are referred to as a right fixed branch rail 831b and a right variable branch rail 832b, respectively. In the example of FIG. 2, the left variable branch rail 832a is installed such that the direction thereof is variable with a rotation center P11 as a rotation axis. The right variable branch rail 832b is installed such that the direction thereof is variable with the rotation center P12 as a rotation axis.

The branching device 840 switches a traveling route of the vehicle 900 by changing a direction of the variable branch rail 832.

The driving device 841 outputs a changeover force for switching the direction of the variable branch rail 832. Here, the changeover of the variable branch rail 832 is switching the direction of the variable branch rail 832 in order to switch the traveling route of the vehicle.

The rods 842 transmit the changeover force from the driving device 841 to the variable branch rail 832. Specifically, the driving device 841 includes a motor that generates the changeover force. As the motor rotates, the driving device 841 moves the rods 842 approximately in a longitudinal direction of the rods 842. The left variable branch rail 832a and the right variable branch rail 832b are coupled to the rods 842. By moving the rods 842, the directions of the left variable branch rail 832a and the right variable branch rail 832b are changed.

In the example of FIG. 2, in the left variable branch rail 832a, the end portion P21 is directed to the outer side of the track 800, and in the right variable branch rail 832b, the end portion P22 is directed to the inner side of the track 800. The end portion P21 is an end portion opposite to the rotation center P11 among both ends in the longitudinal direction of the left variable branch rail 832a. The end portion P22 is an end portion opposite to the rotation center P12 among both ends in the longitudinal direction of the right variable branch rail 832b.

The vehicle 900 travels on the travel route formed by the track 800. The vehicle 900, for example, transports passengers or cargo. The vehicle body 910 accommodates transport targets such as the passengers or cargo. Further, the traveling tire 950 is provided at a lower portion of the vehicle body 910. Further, the support 920 is provided to project laterally from the vehicle body 910.

The support 920 supports the guide wheels 930 and the branch wheels 940. Specifically, the guide wheels 930 and the branch wheels 940 are provided at the right and left end portions of the support 920, respectively. The support 920 keeps a distance between the vehicle body 910 and each of the guide wheel 930 and the branch wheel 940 approximately constant.

As described above, the guide wheel 930 comes into contact with the guide rail 820 when the vehicle 900 travels and restricts the direction of the vehicle 900 so that the vehicle 900 travels on the road surface 810. The branch wheel 940 moves along the branch rail 830 at the branch point of the track 800 and guides the vehicle 900 to any of the tracks 800 of the branch destination. In the example of FIG. 2, the right branch wheel 940 of the vehicle 900 moves along the right variable branch rail 832b and the right fixed branch rail 831b to cause the vehicle 900 to travel straight. "Right side of the vehicle 900" described herein is the right side in the traveling direction of the vehicle 900.

The traveling tire 950 is provided on the lower side (the side close to the road surface 810) of the vehicle body 910 and is in contact with the road surface 810. "Lower side of the vehicle body 910" described herein is the side close to the road surface 810. As the traveling tire 950 rotates, the vehicle 900 moves. That is, as the traveling tire 950 rotates, the vehicle 900 travels.

Figure 3:
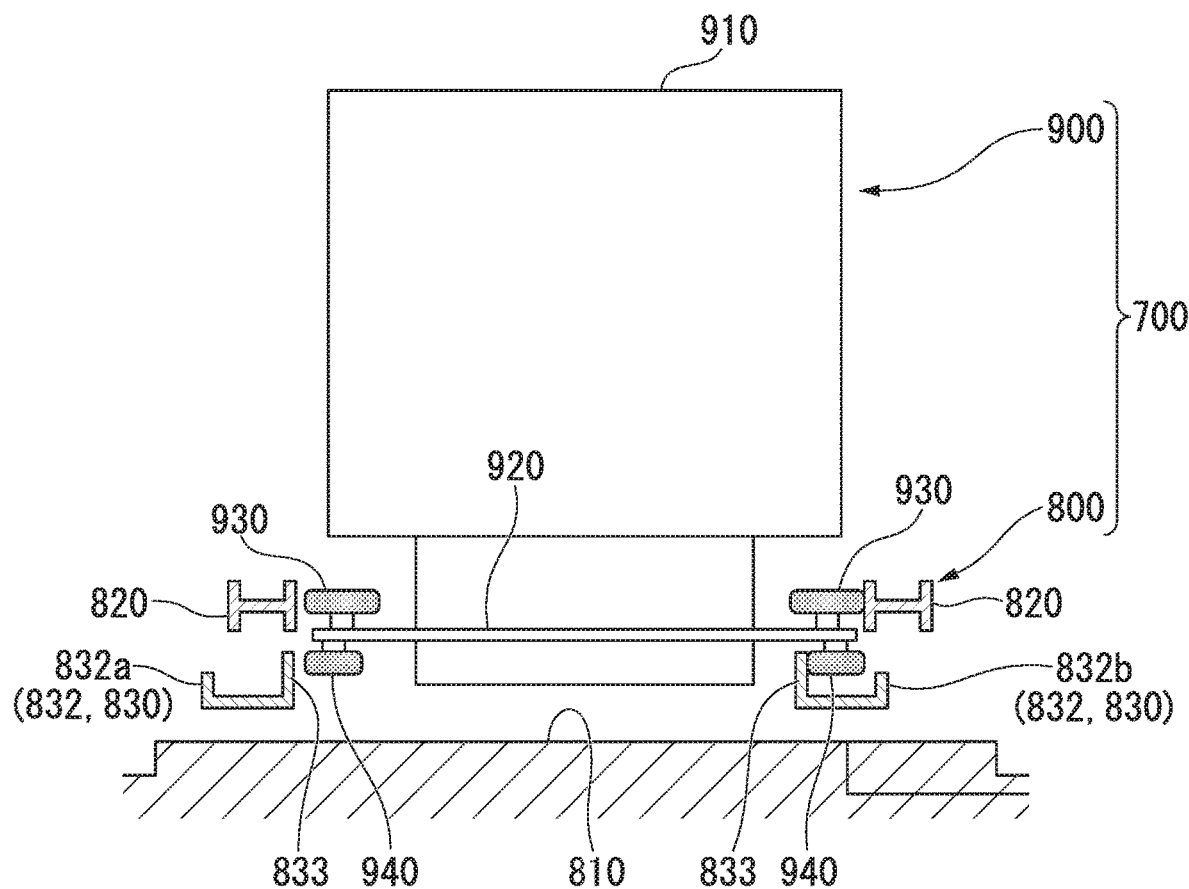
FIG. 3 is an illustrative diagram showing an example of a position of a branch rail when a vehicle travels straight according to an embodiment of the present invention.

FIG. 3 is an illustrative diagram showing an example of a position of the branch rail when the vehicle travels straight. FIG. 3 shows a positional relationship between the branch wheel 940 and the variable branch rail 832 at the position of the line L11 in FIG. 2 when viewed from the rear side in the traveling direction of the vehicle 900. In FIG. 3, the road surface 810, the guide rail 820, the left variable branch rail 832a, the right variable branch rail 832b, the vehicle body 910, the support 920, the guide wheel 930, and the branch wheel 940 among the respective units in FIG. 2 are shown.

As shown in FIG. 3, an inner wall 833 is provided on the inner side of the variable branch rail 832. "Inner side of the variable branch rail 832" described herein is the side close to the variable branch rail 832 on the opposite side.

When the branch wheel 940 is located on the outer side relative to the inner wall 833, the branch wheel 940 moves along the variable branch rail 832 as the vehicle 900 travels. On the other hand, when the branch wheel 940 is located on the inner side relative to the inner wall 833, the branch wheel 940 is not constrained by the variable branch rail 832.

The same applies to the fixed branch rail 831.

In the example of FIG. 3, the branch wheel 940 on the right side in the traveling direction of the vehicle 900 is located on the outer side relative to the inner wall 833 of the right variable branch rail 832b. Accordingly, as shown in FIG. 2, the branch wheel 940 on the right side in the traveling direction of the vehicle 900 moves along the right variable branch rail 832b.

On the other hand, in the example of FIG. 3, the branch wheel 940 on the left side in the traveling direction of the vehicle 900 is located on the inner side relative to the inner wall 833 of the left variable branch rail 832a. Accordingly, as shown in FIG. 2, the branch wheel 940 on the left side in the traveling direction of the vehicle 900 can move away from the left variable branch rail 832a.

Accordingly, as shown in FIG. 2, the vehicle 900 moves straight while moving along the right variable branch rail 832b.

As described with reference to FIG. 2, in the left variable branch rail 832a, the end portion P21 is directed to the outer side of the track 800. Therefore, in FIG. 3, the left variable branch rail 832a is located on the outer side of the track 800 and the right variable branch rail 832b is located on the inner side of the track 800. In particular, the left variable branch rail 832a is located under the guide rail 820, whereas the right variable branch rail 832b is located on the inner side relative to the guide rail 820. "Inner side" described herein is the inner side of the track 800.

Accordingly, the branch wheel 940 on the left side in the traveling direction of the vehicle 900 is located on the inner side relative to the inner wall 833 of the left variable branch rail 832a.

On the other hand, in the right variable branch rail 832b, the end portion P22 is directed to the inner side of the track 800. Accordingly, the branch wheel 940 on the right side in the traveling direction of the vehicle 900 is located on the outer side relative to the inner wall 833 of the right variable branch rail 832b.

Figure 4:
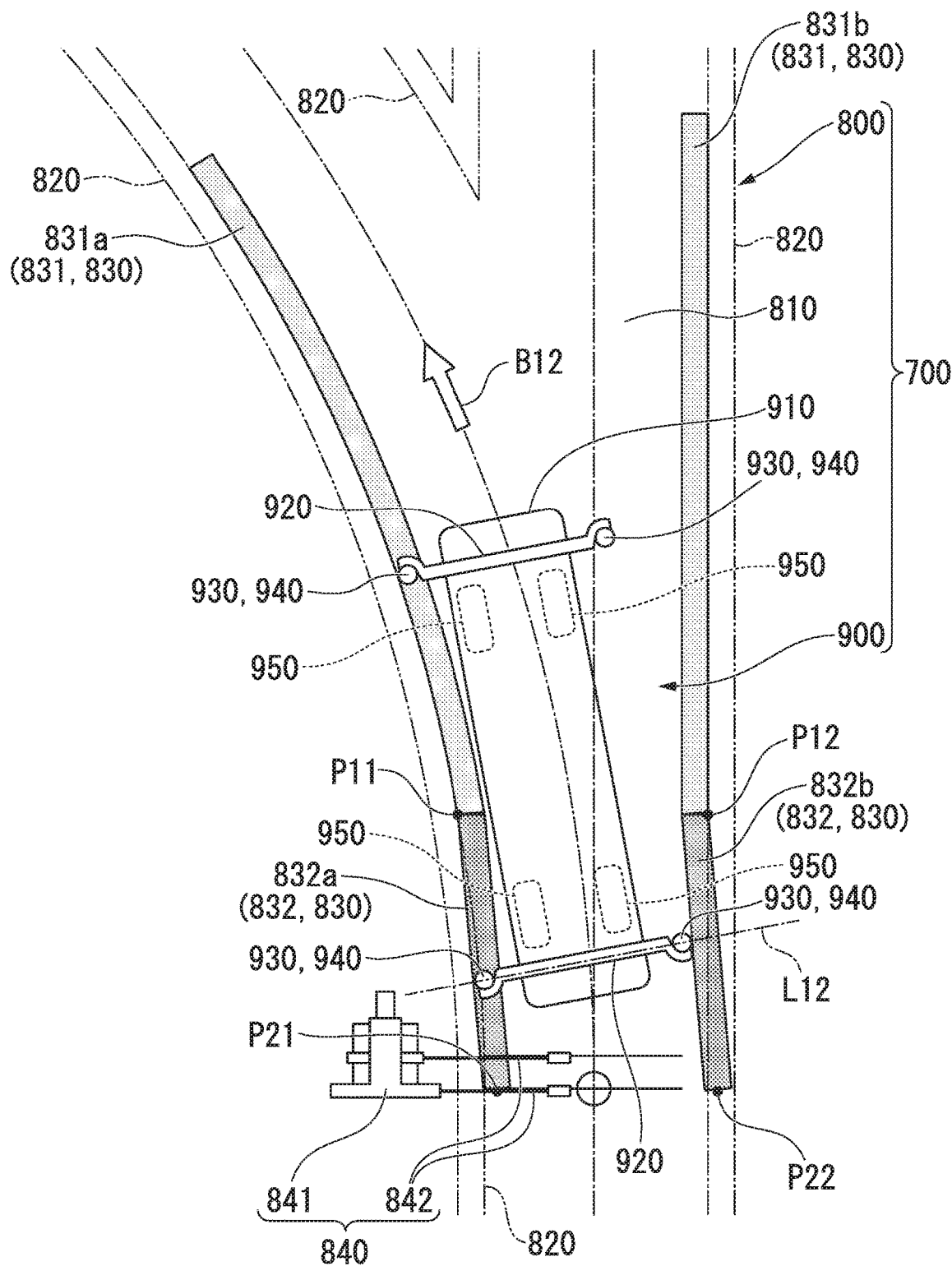
FIG. 4 is an illustrative diagram showing an example of a direction of a branch rail when a vehicle turns left according to the embodiment of the present invention.

FIG. 4 is an illustrative diagram showing an example of the direction of the branch rail when the vehicle turns left. FIG. 4 shows a state in which the vehicle traveling on the branch point of the track is viewed from above. "Above" described herein is the skyward side.

The configuration shown in FIG. 4 is the same as that in FIG. 2. Portions shown in FIG. 4 that are the same as the portions in FIG. 2 are denoted with the same reference numerals (700, 800, 810, 820, 830, 831, 831a, 831b, 832, 832a, 832b, 840, 841, 842, 900, 910, 920, 930, 940, and 950) and a description thereof will be omitted. Further, rotation centers P11 and P12 shown in FIG. 4 are also the same as those in the case of FIG. 2, and a description thereof will be omitted.

In the example of FIG. 4, the direction of the left variable branch rail 832a and the direction of the right variable branch rail 832b are different from those in the case of FIG. 2. In the example of FIG. 4, in the left variable branch rail 832a, the end portion P21 is directed to the inner side of the track 800 and in the right variable branch rail 832b, the end portion P22 is directed to the outer side of the track 800.

Further, in the example of FIG. 2, the branch wheel 940 on the right side of the vehicle 900 moves along the right variable branch rail 832b and the right fixed branch rail 831b, whereas in the example of FIG. 4, the branch wheel 940 on the left side of the vehicle 900 moves along the left variable branch rail 832a and the left fixed branch rail 831a. Accordingly, the vehicle 900 turns left. The traveling direction of the vehicle 900 in FIG. 4 is indicated by an arrow B12.

Figure 5:
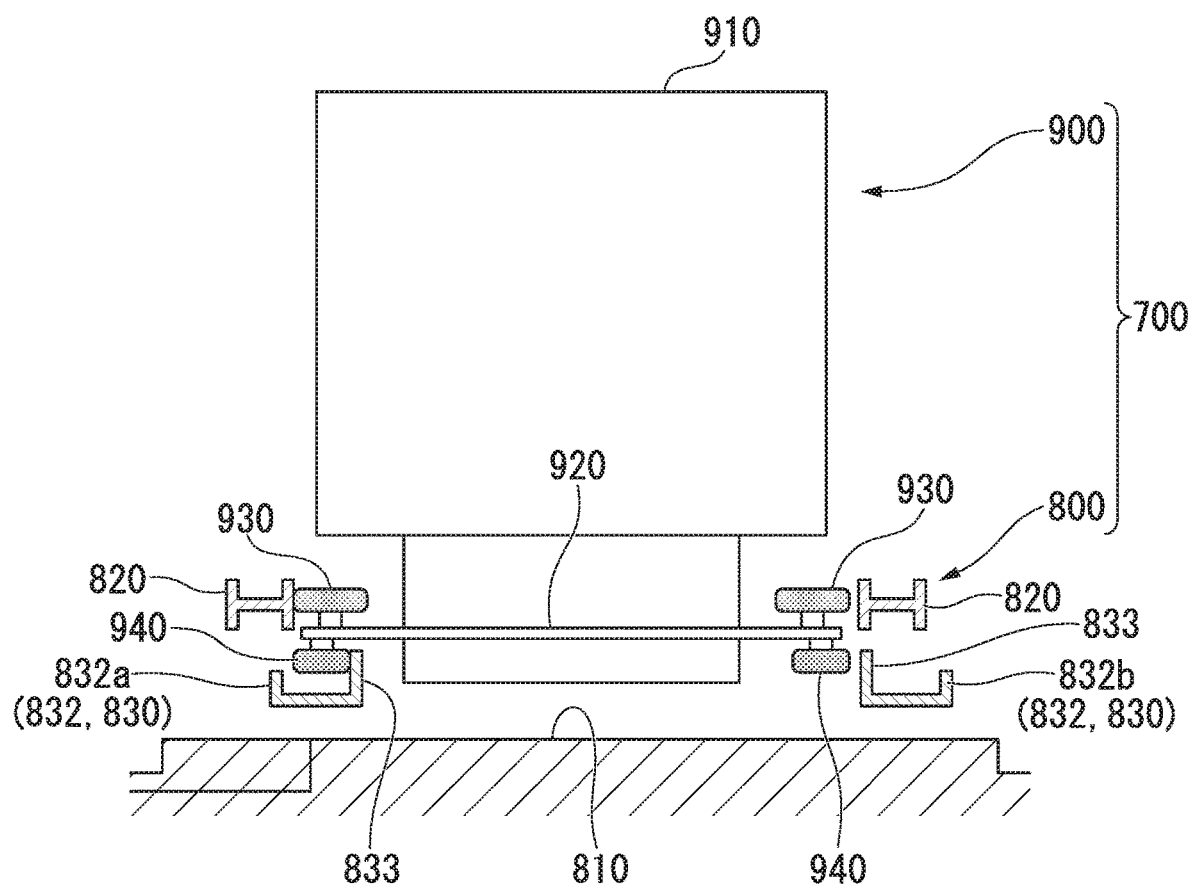
FIG. 5 is an illustrative diagram showing an example of a position of a branch rail when a vehicle turns left according to the embodiment of the present invention.

FIG. 5 is an illustrative diagram showing an example of the position of the branch rail when the vehicle turns left. FIG. 5 shows a positional relationship between the branch wheel 940 and the variable branch rail 832 at a position of a line L12 in FIG. 4 when viewed from the rear side in the traveling direction of the vehicle 900. The road surface 810, the guide rail 820, the left variable branch rail 832a, the right variable branch rail 832b, the vehicle body 910, the support 920, the guide wheel 930, and the branch wheel 940 among the respective units in FIG. 4 are shown in FIG. 5.

The configuration shown in FIG. 5 is the same as that in the case of FIG. 3. Portions shown in FIG. 5 that are the same as the portions in FIG. 3 are denoted with the same reference numerals (700, 800, 810, 820, 830, 832, 832a, 832b, 833, 900, 910, 920, 930, and 940) and a description thereof will be omitted.

In the example of FIG. 5, the position of the variable branch rail 832 is different from that in the case of FIG. 3. Accordingly, in the example of FIG. 5, a positional relationship between the variable branch rail 832 and the branch wheel 940 also differs from that in the case of FIG. 3.

Specifically, in the example of FIG. 5, the branch wheel 940 on the left side in the traveling direction of the vehicle 900 is located on the outer side relative to an inner wall 833 of the left variable branch rail 832a. Accordingly, the branch wheel 940 on the left side in the traveling direction of the vehicle 900 moves along the left variable branch rail 832a, as shown in FIG. 4.

On the other hand, in the example of FIG. 5, the branch wheel 940 on the right side in the traveling direction of the vehicle 900 is located on the inner side relative to the inner wall 833 of the right variable branch rail 832b. Accordingly, the branch wheel 940 on the right side in the traveling direction of the vehicle 900 can move away from the right variable branch rail 832b, as shown in FIG. 4.

Accordingly, the vehicle 900 turns left while moving along the left variable branch rail 832a, as shown in FIG. 4.

As described with reference to FIG. 4, in the right variable branch rail 832b, the end portion P22 is directed to the outer side of the track 800. Therefore, in FIG. 5, the right variable branch rail 832b is located on the outer side of the track 800, and the left variable branch rail 832a is located on the inner side of the track 800. In particular, the right variable branch rail 832b is located under the guide rail 820, whereas the left variable branch rail 832a is located on the inner side relative to the guide rail 820. "Inner side" described herein is on the inner side of the track 800.

Accordingly, the branch wheel 940 on the right side in the traveling direction of the vehicle 900 is located on the inner side relative to the inner wall 833 of the right variable branch rail 832b.

On the other hand, in the left variable branch rail 832a, the end portion P21 is directed to the inner side of the track 800. Accordingly, the branch wheel 940 on the left side in the traveling direction of the vehicle 900 is located on the outer side relative to the inner wall 833 of the left variable branch rail 832a.

The measurement unit 100 measures various pieces of data regarding the driving device 841 using various sensors installed in the driving device 841 or in the vicinity thereof. The changeover force measurement unit 110 measures the direction and magnitude of the changeover force that is output by the driving device 841. Specifically, the changeover force measurement unit 110 includes a load sensor installed on the rod 842, and measures the load applied to the rod 842 at the time of changeover.

For example, a strain gauge (a strain gauge type load cell) can be used as the load sensor included in the changeover force measurement unit 110. In this case, the changeover force measurement unit 110 includes a power supply such as a battery and applies a DC voltage to the strain gauge. When the strain gauge is compressed or pulled with compression or tension of the rod 842 and a resistance value changes, the current flowing through the strain gauge is changed. The changeover force measurement unit 110 measures the direction and the magnitude of the changeover force output from the driving device 841 by calibrating the current flowing through the strain gauge using an amplifier.

Figure 6:
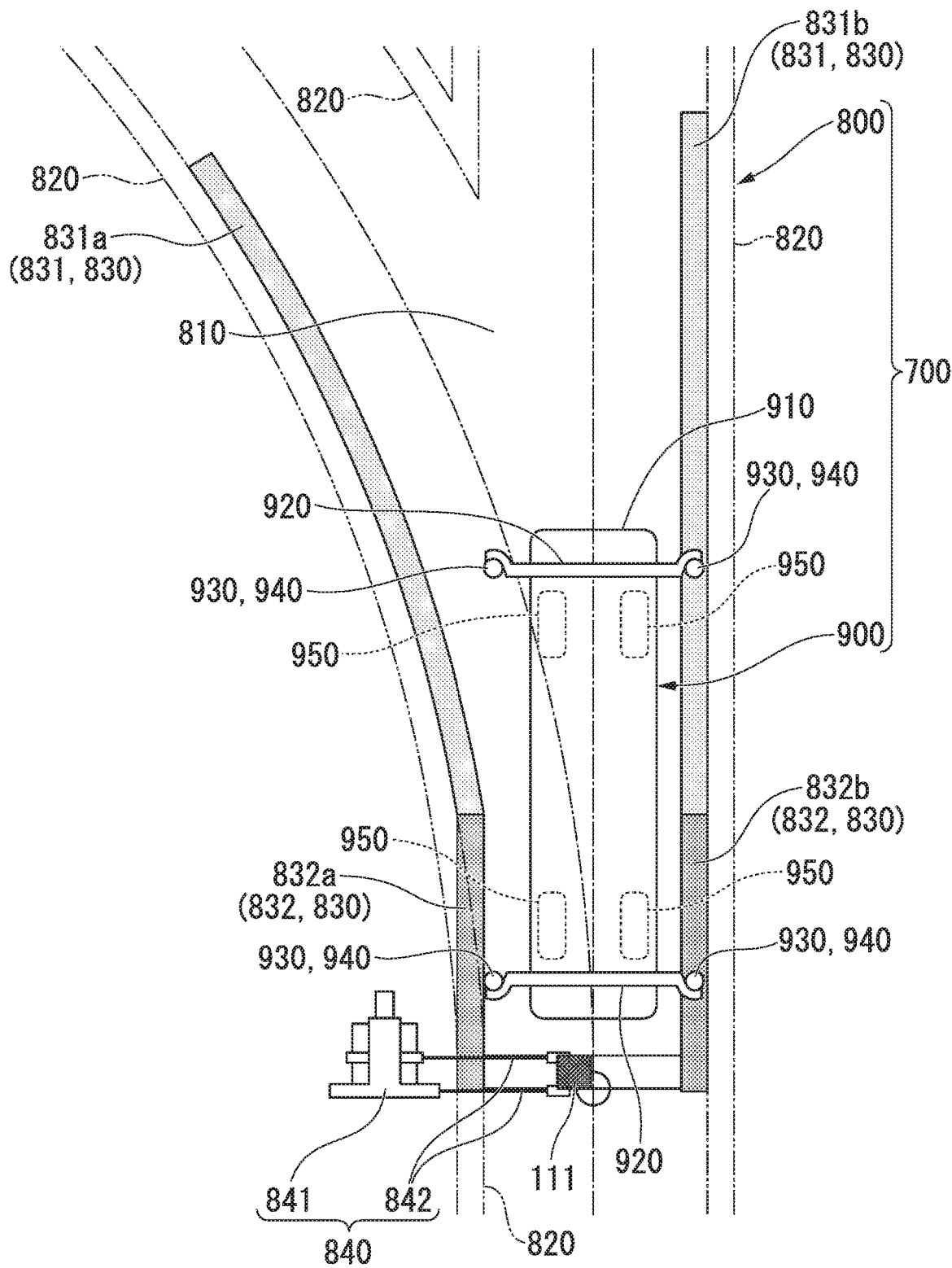
FIG. 6 is an illustrative diagram showing an example of an installation position of a load sensor according to an embodiment of the present invention.

FIG. 6 is an illustrative diagram showing an example of an installation position of the load sensor. Portions shown in FIG. 6 that are the same as the portions in FIG. 2 are denoted with the same reference numerals (700, 800, 810, 820, 830, 831, 831a, 831b, 832, 832a, 832b, 840, 841, 842, 900, 910, 920, 930, 940, and 950) and a description thereof will be omitted.

In the example of FIG. 6, a load sensor 111 of the changeover force measurement unit 110 is shown in addition to each part shown in FIG. 2. Specifically, the load sensor 111 is provided on the rod 842. When a strain gauge is used as the load sensor 111, the load sensor 111 which is the strain gauge is attached to the rod 842, as shown in FIG. 6. By detecting the compression or tension of the rod 842 using the load sensor 111, it is possible to measure the direction and the magnitude of the changeover force output from the driving device 841, as described above.

However, the load sensor included in the changeover force measurement unit 110 is not limited to the strain gauge, and the changeover force measurement unit 110 may include a sensor other than the strain gauge, such as a capacitive load cell. Alternatively, the changeover force measurement unit 110 may measure the changeover force by measuring the load (for example, a load torque) of a motor that outputs the changeover force.

The current measurement unit 120 includes a current sensor and measures a current flowing through the driving device 841. The voltage measurement unit 130 includes a voltage sensor and measures a voltage supplied to the driving device 841.

Figure 7:
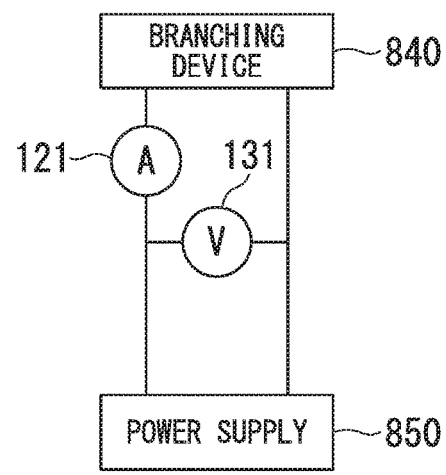
FIG. 7 is an illustrative diagram showing an example of measurement places of a current and a voltage in an embodiment of the present invention.

FIG. 7 is an illustrative diagram showing an example of measurement places of the current and the voltage. In the example of FIG. 7, a voltage sensor 131 of the voltage measurement unit 130 measures a voltage of a power supply 850 that supplies power to the driving device 841. Further, a current sensor 121 of the current measurement unit 120 measures a current from the power supply 850 to the driving device 841. That is, the current sensor 121 and the voltage sensor 131 measure a power supply current and a power supply voltage of the driving device 841, respectively.

However, a measurement place of the current flowing through the driving device 841 and a measurement place of the voltage supplied to the driving device 841 are not limited thereto. For example, the current sensor 121 of the current measurement unit 120 may be provided inside the driving device 841 and measure the current flowing through the motor generating the above-described changeover force. Further, the voltage sensor 131 of the voltage measurement unit 130 may be provided inside the driving device 841 and measure the voltage applied to the motor.

The displacement measurement unit 140 includes a displacement sensor and measures a displacement of the branch rail 830 for each of the right and left branch rails 830.

Figure 8:
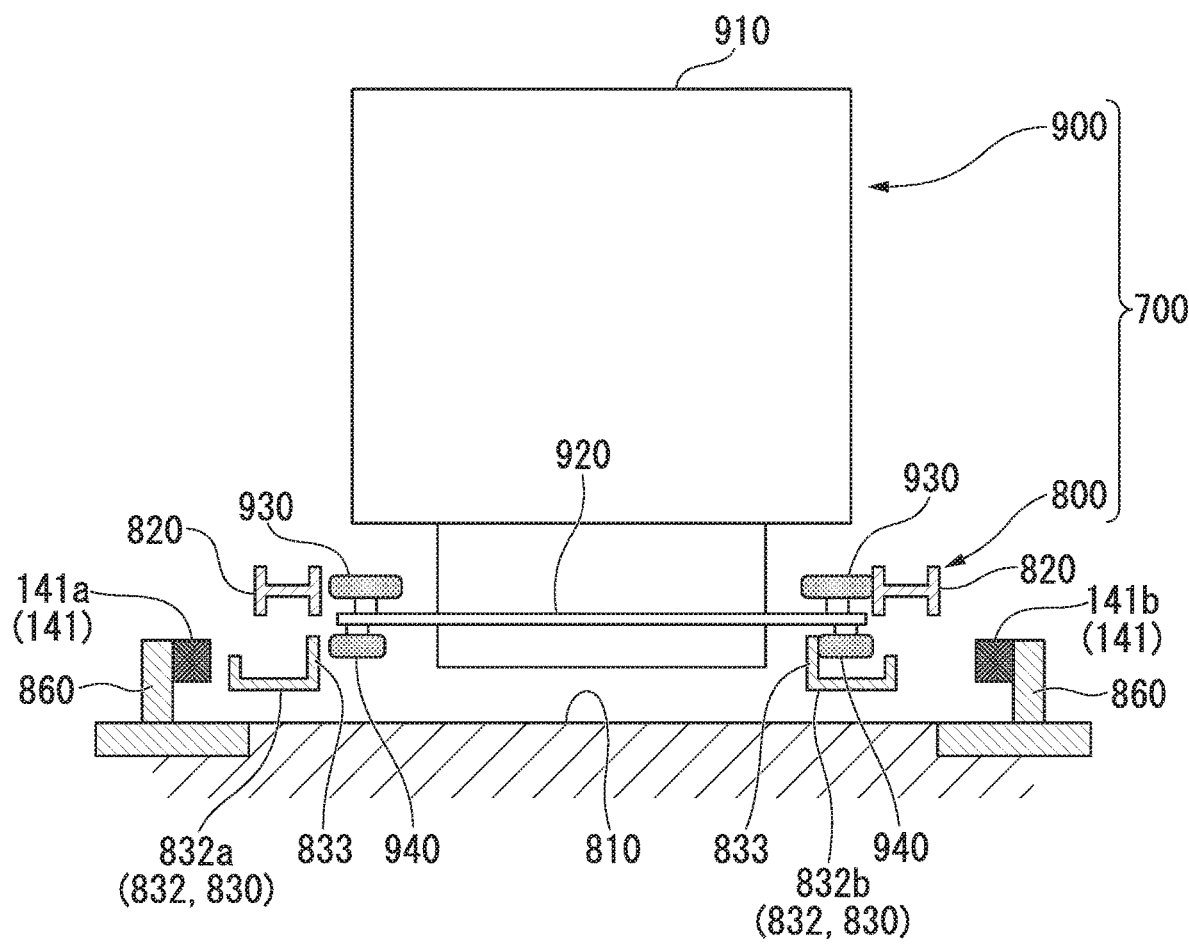
FIG. 8 is an illustrative diagram showing an example of an installation position of a displacement sensor according to an embodiment of the present invention.

FIG. 8 is an illustrative diagram showing an example of an installation position of the displacement sensor. Portions shown in FIG. 8 that are the same as the portions in FIG. 3 are denoted with the same reference numerals (700, 800, 810, 820, 830, 832, 832*a*, 832*b*, 833, 900, 910, 920, 930, and 940) and description thereof will be omitted.

In the example of FIG. 8, a displacement sensor 141 of the displacement measurement unit 140 and a support 860 that supports the displacement sensor 141 are shown, in addition to the respective units shown in FIG. 3. Specifically, the supports 860 are provided on the outer sides of the left and right variable branch rails 832, and the displacement sensors 141 are provided in the respective supports 860.

Various sensors capable of measuring a distance between the displacement sensor 141 itself and the variable branch rail 832 or a change in the distance between the displacement sensor 141 itself and the variable branch rail 832 can be used as the displacement sensor 141. For example, the displacement sensor 141 may be an eddy current type sensor or may be a laser type, ultrasonic type, or wire type sensor.

Hereinafter, the displacement sensor 141 provided on the support 860 on the left side in the traveling direction of the vehicle 900 is referred to as a left displacement sensor 141*a*. Further, the displacement sensor 141 provided on the support 860 on the right side in the traveling direction of the vehicle 900 is referred to as a right displacement sensor 141*b*. The displacement measurement unit 140 detects a change in the distance between the left displacement sensor 141*a* and the left variable branch rail 832*a* to detect the displacement of the left variable branch rail 832*a*. The "displacement of the left variable branch rail 832*a*" described herein is a change in the position of the left variable branch rail 832*a*.

Similarly, the displacement measurement unit 140 detects a change in the distance between the right displacement sensor 141*b* and the right variable branch rail 832*b* to detect the displacement of the right variable branch rail 832*b* (a change in the position of the right variable branch rail 832*b*). "Displacement of the right variable branch rail 832*b*" described herein is a change in the position of the right variable branch rail 832*b*.

Figure 9:
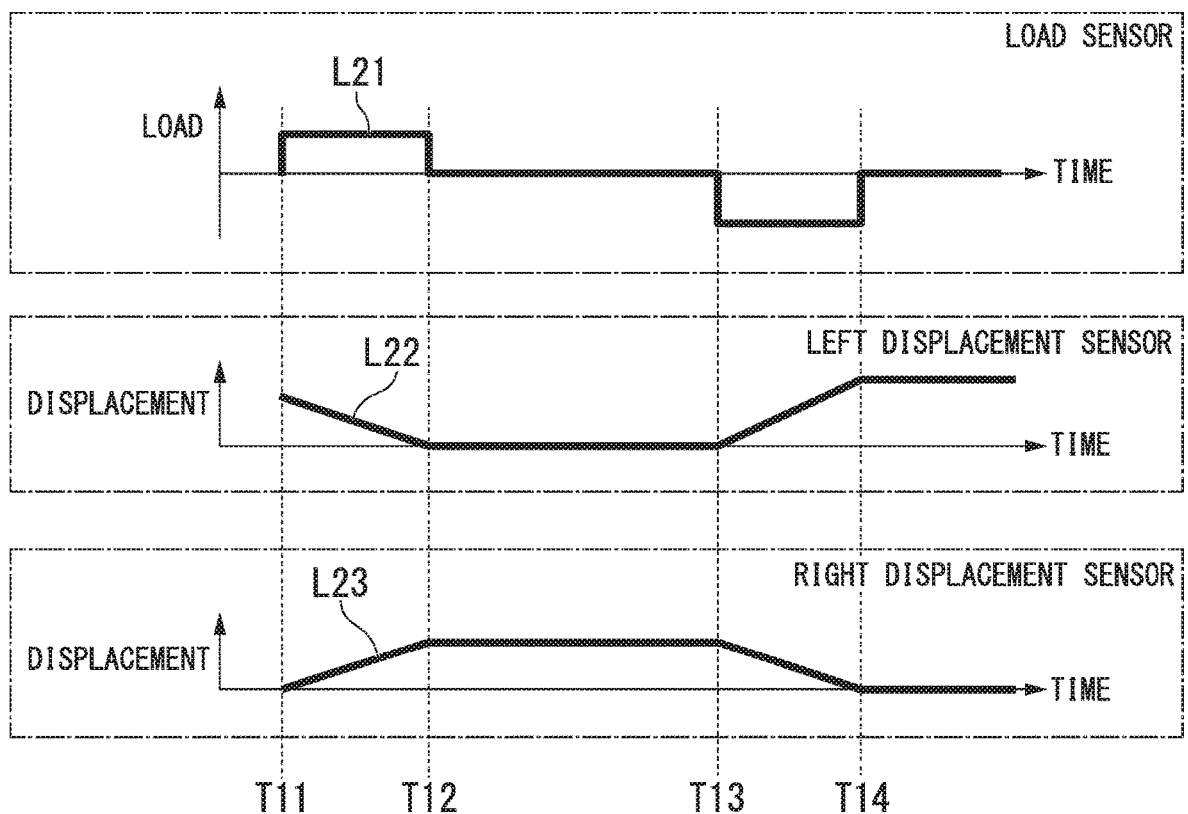
FIG. 9 is a graph showing an example of a measured value of a load sensor and a measured value of a displacement sensor according to an embodiment of the present invention.

FIG. 9 is a graph showing examples of measured values of the load sensor 111 and measured values of the displacement sensor 141. FIG. 9 shows an example when the variable branch rail 832 operates normally.

A line L21 in FIG. 9 indicates an example of the measured value of the load at the time of changeover of the variable branch rail 832 obtained by the load sensor 111. The measured value here is a measured value of the changeover force output by the driving device 841. A horizontal axis of a graph of the line L21 indicates time and a vertical axis indicates the load.

A line L22 indicates an example of the displacement of the left variable branch rail 832*a* obtained by the left displacement sensor 141*a*. A horizontal axis of a graph of the line L22 indicates time that is the same as that of the horizontal axis of the graph of the line L21 and a vertical axis indicates the displacement. A lower side of the vertical axis indicates that the left variable branch rail 832*a* is close to the left displacement sensor 141*a*, and an upper side of the vertical axis indicates that the left variable branch rail 832*a* is far from the left displacement sensor 141*a*.

A line L23 indicates an example of the displacement of the right variable branch rail 832*b* obtained by the right displacement sensor 141*b*. A horizontal axis of a graph of the line L23 indicates time that is the same as that of the horizontal axis of the graph of the line L21, and a vertical axis indicates the displacement. A lower side of the vertical axis indicates that the right variable branch rail 832*b* is close to the right displacement sensor 141*b* and an upper side of the vertical axis indicates that the right variable branch rail 832*b* is far from the right displacement sensor 141*b*.

In time T11, in the left variable branch rail 832*a*, the end portion P21 is directed to the inner side of the track 800 and, in the right variable branch rail 832*b*, the end portion P22 is directed to the outer side of the track 800, as in the example of FIGS. 4 and 5. Therefore, the left variable branch rail 832*a* is at a position relatively far from the left displacement sensor 141*a*, as indicated by the line L22. On the other hand, the right variable branch rail 832*b* is at a position relatively close to the right displacement sensor 141*b*, as indicated by the line L23.

From time T11 to time T12, the driving device 841 outputs the changeover force, and the rod 842 transmits the changeover force to each of the left variable branch rail 832*a* and the right variable branch rail 832*b*, as indicated by the line L21. Accordingly, the left variable branch rail 832*a* performs an operation of changing the direction to approach the left displacement sensor 141*a*, as indicated by the line L22. Further, the right variable branch rail 832*b* performs an operation of changing the direction to move away from the right displacement sensor 141*b*, as indicated by a line L23.

At time T12, as in the example of FIGS. 2 and 3, in the left variable branch rail 832*a*, the end portion P21 is directed to the outer side of the track 800 and, in the right variable branch rail 832*b*, the end portion P22 is directed to the inner side of the track 800. Therefore, the left variable branch rail 832*a* is at a position relatively close to the left displacement sensor 141*a*, as indicated by the line L22. On the other hand, the right variable branch rail 832*b* is at a position relatively far from the right displacement sensor 141*b*, as indicated by the line L23.

From time T12 to time T13, the driving device 841 stops the output of the changeover force, and the left variable branch rail 832*a* and the right variable branch rail 832*b* maintain the states shown in FIGS. 2 and 3, as indicated by line L21.

From time T13 to time T14, the driving device 841 outputs the changeover force, and the rod 842 transmits the changeover force to each of the left variable branch rail 832*a* and the right variable branch rail 832*b*, as indicated by the line L21. From time T13 to time T14, the driving device 841 outputs the changeover force in a direction opposite to the direction in the case from time T11 to time T12. Accordingly, the left variable branch rail 832*a* performs an operation of changing the direction to move away from the left displacement sensor 141*a*, as indicated by the line L22. Further, the right variable branch rail 832*b* performs an operation of changing the direction to approach the right displacement sensor 141*b*, as indicated by a line L23.

At time T14, in the left variable branch rail 832*a*, the end portion P21 is directed to the inner side of the track 800 and, in the right variable branch rail 832*b*, the end portion P22 is directed to the outer side of the track 800, as in the examples of FIGS. 4 and 5, similar to the case of time T11.

After time T14, the driving device 841 stops the output of the changeover force, and the left variable branch rail 832*a* and the right variable branch rail 832*b* maintain the states shown in FIGS. 4 and 5, as indicated by the line L21.

The driving device temperature measurement unit 150 measures a temperature of the branching device 840. For example, the driving device temperature measurement unit 150 is provided inside a motor that generates the above-described changeover force or on an outer surface of the motor, and measures a temperature of this motor.

The environmental temperature measurement unit 160 measures an environmental temperature at a branch place that is a monitoring target. For example, the environmental temperature measurement unit 160 measures an outside air temperature.

It should be noted that the measurement unit 100 does not necessarily include all of the changeover force measurement unit 110, the current measurement unit 120, the voltage measurement unit 130, the displacement measurement unit 140, and the driving device temperature measurement unit 150, and may include two or more of the measurement units. For example, the measurement unit 100 may be configured to include the changeover force measurement unit 110, the current measurement unit 120, and the voltage measurement unit 130 and not to include the displacement measurement unit 140 and the driving device temperature measurement unit 150.

The anomaly determination device body 200 detects an anomaly in the branching device 840 on the basis of the measured value from the measurement unit 100. The anomaly determination device body 200 is configured using, for example, a computer.

The measurement result acquisition unit 210 acquires various measured values from the measurement unit 100. The measurement result acquisition unit 210 includes, for example, a communication circuit included in the anomaly determination device body 200, and functions as a communication interface between the anomaly determination device body 200 and the measurement unit 100.

The operation input unit 220 includes, for example, an input device such as a keyboard and a mouse and receives user operations.

The display unit 230 includes, for example, a display surface such as a liquid crystal panel or a light emitting diode (LED) panel and displays various images. In particular, the display unit 230 displays a determination result of the anomaly determination unit 291 determining whether or not there is an anomaly in the branching device 840 and the anomaly occurrence place.

The storage unit 280 is configured using a storage device included in the anomaly determination device body 200 and stores various pieces of data.

The measurement result storage unit 281 stores various measured values of the measurement unit 100. For example, the measurement result storage unit 281 stores a history of the measured value measured by each unit in the measurement unit 100 for each functional unit that has performed measurement and in association with information indicating a measurement time.

The control unit 290 controls each unit of the anomaly determination device 1 to execute various processes. The control unit 290 is configured, for example, by a central processing unit (CPU) included in the anomaly determination device 1 reading and executing a program from the storage unit 280.

The anomaly determination unit 291 determines whether or not there is an anomaly on the basis of the measured value of the changeover force from the changeover force measurement unit 110, the measured value of the current from the current measurement unit 120, and the measured value of the voltage from the voltage measurement unit 130. In particular, the anomaly determination unit 291 determines whether or not there is an anomaly in the branch rail 830, there is an anomaly in the driving device 841, and there is an anomaly in power supplied to the driving device 841.

FIG. 10 is an illustrative diagram showing an example of an anomaly and an anomaly occurrence place determined by the anomaly determination unit 291. As shown in FIG. 10, the anomaly determination unit 291 determines a cause and the anomaly occurrence place on the basis of a measurement item and detected anomaly. The anomaly determination unit 291 causes the display unit 230 to display a message indicating the determined cause and the determined anomaly occurrence place. Hereinafter, the message indicating an anomaly displayed by the display unit 230 is referred to as an alarm.

As shown in FIG. 10, when the displacement measured by the displacement measurement unit 140 is smaller than a predetermined the amount of displacement (that is, when the changeover of the variable branch rail 832 is incomplete), the anomaly determination unit 291 determines that there is a possibility of the variable branch rail 832 being stained with a foreign object and the displacement being insufficient due to the foreign object caught in the variable branch rail 832. In this case, the anomaly determination unit 291 determines that the anomaly occurrence place is the variable branch rail 832.

Further, when the amounts of right and left displacements are different, the anomaly determination unit 291 determines that engagement between the variable branch rail 832 and the rod 842 is likely to be loose. In this case, the anomaly determination unit 291 determines that the anomaly occurrence place is the variable branch rail 832. Here, an example of a case in which the amounts of left and right displacements are different may include a case in which a difference between the magnitude of the amount of displacement measured by the left displacement sensor 141a and the magnitude of the amount of displacement measured by the right displacement sensor 141b is equal to or larger than a predetermined threshold value.

Thus, the anomaly determination unit 291 determines whether or not there is an anomaly in the variable branch rail 832 on the basis of the difference between the displacement of the left variable branch rail 832a and the displacement of the right variable branch rail 832b. Further, when the displacement measured by the displacement measurement unit 140 has an offset equal to or larger than a predetermined threshold value, the anomaly determination unit 291 determines that the variable branch rail 832 or the rod 842 is likely to be deformed. In this case, the anomaly determination unit 291 determines that the anomaly occurrence place is the variable branch rail 832.

Further, when a switching speed of the variable branch rail 832 is lower than a predetermined threshold value, the anomaly determination unit 291 determines that there is a possibility of the variable branch rail 832 being stiff due to rust, freezing, or the like. In this case, the anomaly determination unit 291 determines that the anomaly occurrence place is the variable branch rail 832.

The switching speed of the variable branch rail 832 described herein is a speed of displacement of the variable branch rail 832 when the direction of the variable branch rail 832 is switched. For example, the anomaly determination unit 291 calculates the switching speed of the variable branch rail 832 by dividing the displacement of the variable branch rail 832 measured by the displacement sensor 141 by time.

Further, when the changeover force measured by the changeover force measurement unit 110 is larger than a predetermined threshold value, the anomaly determination unit 291 determines that there is a possibility of the variable branch rail 832 being stiff due to rust, freezing, or the like. In this case, the anomaly determination unit 291 determines that the anomaly occurrence place is the variable branch rail 832. Here, it is shown that resistance when the driving device 841 switches the direction of the variable branch rail 832 increases when the changeover force measured by the changeover force measurement unit 110 is larger than the predetermined threshold value.

Further, when the voltage measured by the voltage measurement unit 130 is higher than a predetermined upper limit threshold value or lower than a predetermined lower limit threshold value, the anomaly determination unit 291 determines that there is a possibility of failure of a power supply. In this case, the anomaly determination unit 291 determines that the anomaly occurrence place is the power supply.

Further, when the current measured by the current measurement unit 120 is lower than a predetermined threshold value, the anomaly determination unit 291 determines that there is a possibility of failure of the driving device 841, such as disconnection or contact failure inside the driving device 841. In this case, the anomaly determination unit 291 determines that the anomaly occurrence place is the driving device 841.

Further, when the current measured by the current measurement unit 120 is higher than a predetermined upper limit threshold value or lower than a predetermined lower limit threshold value, the anomaly determination unit 291 determines that there is a possibility of failure of the power supply. In this case, the anomaly determination unit 291 determines that the anomaly occurrence place is the power supply.

It should be noted that when the current measured by the current measurement unit 120 is lower than the predetermined threshold value, the anomaly determination unit 291 performs separation of the cause and the anomaly occurrence place on the basis of whether or not there is an anomaly in the voltage measured by the voltage measurement unit 130. Specifically, when it is determined that there is an anomaly in the voltage measured by the voltage measurement unit 130, the anomaly determination unit 291 determines that there is a possibility of failure of the power supply and determines that the anomaly occurrence place is the power supply. On the other hand, when it is determined that there is no anomaly in the voltage measured by the voltage measurement unit 130, the anomaly determination unit 291 determines that there is a possibility of failure of the driving device 841 and determines that the anomaly occurrence place is the driving device 841.

Further, when the temperature measured by the driving device temperature measurement unit 150 is higher than a predetermined first threshold value, the anomaly determination unit 291 determines that there is a possibility of a sign of the failure of the driving device 841. In this case, the anomaly determination unit 291 determines that the anomaly occurrence place is the driving device 841.

When the temperature measured by the driving device temperature measurement unit 150 is higher than a predetermined second threshold value, the anomaly determination unit 291 determines that there is a possibility of burnout occurring inside the driving device 841. In this case, the anomaly determination unit 291 determines that the anomaly occurrence place is the driving device 841. Here, the second threshold value is set to a temperature higher than the first threshold value.

Further, the anomaly determination unit 291 uses the environmental temperature measured by the environmental temperature measurement unit 160 for a determination as to whether or not freezing occurs. For example, when the changeover force measured by the changeover force measurement unit 110 is greater than a predetermined threshold value and the environmental temperature measured by the environmental temperature measurement unit 160 is lower than 0° C., the anomaly determination unit 291 determines that there is a possibility of the variable branch rail 832 being frozen and stiff. An example of the environmental temperature described herein includes an air temperature.

Here, the anomaly determination unit 291 determines whether or not there is an anomaly on the basis of a temporal change in at least one of the measured value of the changeover force from the changeover force measurement unit 110, the measured value of the current from the current measurement unit 120, and the measured value of the voltage from the voltage measurement unit 130.

The temporal change described herein may be a change with the elapse of a relatively long time such as a year. The elapse of the relatively long time such as a year is also referred to as a secular change. Alternatively, the temporal change described herein may be a change with the elapse of a relatively short time such as the elapse of several months.

Figure 11:
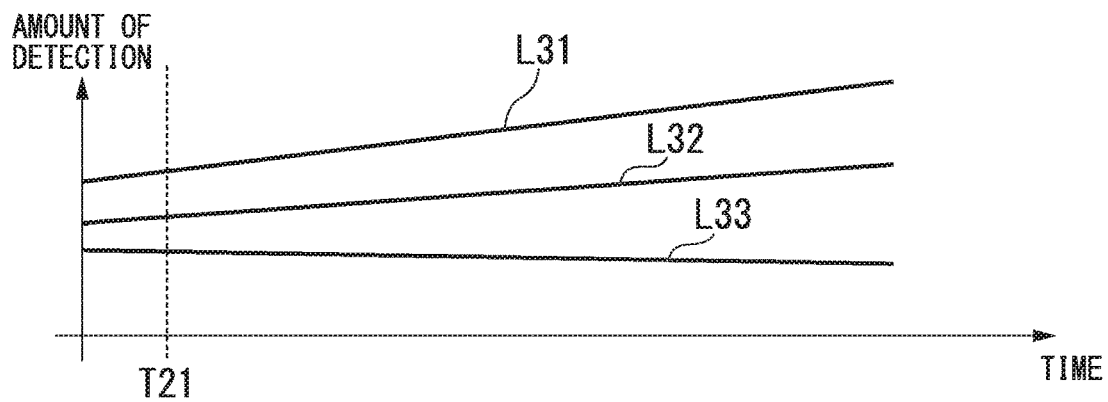
FIG. 11 is a graph showing an example of a temporal change in changeover of a variable branch rail performed by the branching device according to the embodiment of the present invention.

FIG. 11 is a graph showing an example of temporal change of the changeover of the variable branch rail 832 performed by the branching device 840. The "changeover of the variable branch rail 832" described herein is switching of the direction of the variable branch rail 832. In the graph shown in FIG. 11, a horizontal axis indicates time and a vertical axis indicates amount of detection. The "amount of detection" described herein may be a load, a switching time, or a switching speed.

A line L31 indicates an example of a temporal change of the load detected by the load sensor 111. The load detected by the load sensor 111 corresponds to an example of the changeover force measured by the changeover force measurement unit 110 described with reference to FIG. 10.

As described above, when the variable branch rail 832 is stiff due to rust or the like or when a foreign object is caught in the variable branch rail 832, the load measured by the load sensor 111 increases. Further, even when the variable branch rail 832 is stiff due to freezing or the like, the load measured by the load sensor 111 also increases.

This increase in the load indicates an increase in a load on the motor that outputs the changeover force. A state in which the load on the motor is high is a cause of failure. Therefore, when the anomaly determination unit 291 detects a state in which the load is high, the anomaly determination unit 291 causes the display unit 230 to display a message for indicating a possibility of anomaly of the variable branch rail 832 and prompting inspection. The message displayed on the display unit 320 by the variable branch rail 832 corresponds to the above-described alarm.

For example, the measurement result storage unit 281 stores the load measured by the load sensor at time T21 in FIG. 11. The anomaly determination unit 291 causes the display unit 230 to display an alarm when it is detected that the measured value of the load sensor 111 is greater than the load at time T21, which is a reference, by a predetermined load or more.

A line L32 indicates an example of a temporal change in the switching time of the variable branch rail 832. The switching time of the variable branch rail 832 described herein is a time required for switching the direction of the variable branch rail 832 in order to switch the traveling direction of the vehicle. For example, the time required for switching the variable branch rail 832 from the state in FIG. 2 to the state in FIG. 4 corresponds to an example of the switching time of the variable branch rail 832. Further, the time required for changeover of the variable branch rail 832 from the state in FIG. 4 to the state in FIG. 2 also corresponds to an example of the switching time of the variable branch rail 832.

The anomaly determination unit 291 detects, for example, the switching time of the variable branch rail 832 on the basis of the measured value of the load from the load sensor 111. For example, the anomaly determination unit 291 detects a time from start of detection of the changeover force by the load sensor 111 to end of the detection as the switching time of the variable branch rail 832, as in a period between time T11 to time T12 or a period between time T13 and time T14.

For example, when the variable branch rail 832 is stiff due to rust or the like or when a foreign object is caught in the variable branch rail 832, the load measured by the load sensor 111 increases as described above, and the switching time of the variable branch rail 832 also becomes longer.

Therefore, the anomaly determination unit 291 may detect an increase in the switching time of the variable branch rail 832 instead of the increase in the load.

A line L33 indicates an example of a temporal change in the switching speed of the variable branch rail 832. As described above, for example, the anomaly determination unit 291 calculates the switching speed of the variable branch rail 832 by dividing the displacement of the variable branch rail 832 measured by the displacement sensor 141 by a time.

The switching time of the variable branch rail 832 indicated by a line L32 becomes longer when the switching speed of the variable branch rail 832 indicated by the line L33 is slower. Therefore, the anomaly determination unit 291 may detect only any one of the increase in the load, the increase in the switching time of the variable branch rail 832, and the decrease in the switching speed of the variable branch rail 832.

Alternatively, the anomaly determination unit 291 may detect the increase in the load or the increase in the switching time of the variable branch rail 832 and the decrease in the switching speed of the variable branch rail 832. Accordingly, even when any one of the load sensor 111 and the displacement sensor 141 has failed, it is possible to detect an anomaly in the variable branch rail 832.

Thus, the anomaly determination unit 291 may determine whether or not there is an anomaly on the basis of the temporal change in the measured value by determining whether or not there is an anomaly with reference to past measured values. By setting a threshold value for the anomaly determination with reference to the past measured values, the anomaly determination unit 291 can set a threshold value according to an individual difference of the device. Using this threshold value, the anomaly determination unit 291 can determine whether or not there is an anomaly with higher accuracy.

It should be noted that the anomaly determination unit 291 may determine whether or not there is an anomaly by comparing one type of measured value with a threshold value or may determine whether or not there is an anomaly by comparing a combination of a plurality of types of measured values with a threshold value. This point will be described with reference to FIGS. 12 and 13.

Figure 12:
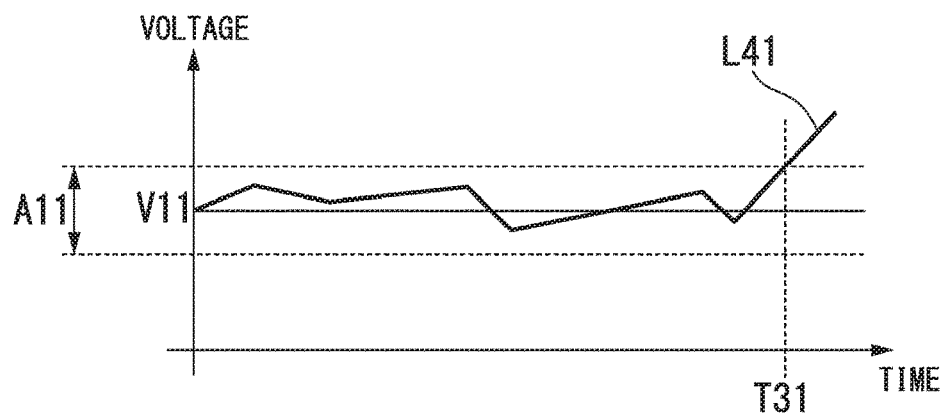
FIG. 12 is a graph showing an example in which the anomaly determination unit according to the embodiment of the present invention determines whether or not there is an anomaly by comparing one type of measured value with a threshold value.

FIG. 12 is a graph showing an example in which the anomaly determination unit 291 determines whether or not there is an anomaly by comparing one type of measured value with a threshold value. In FIG. 12, a horizontal axis indicates time and a vertical axis indicates a voltage. A line L41 indicates an example of a voltage measured by the voltage measurement unit 130.

Further, a voltage V11 in FIG. 12 indicates a reference value of the voltage measured by the voltage measurement unit 130, and an area A11 including the voltage V11 indicates a range in which the anomaly determination unit 291 determines the normality.

As described with reference to FIG. 11, the anomaly determination unit 291 may set a predetermined range from a reference value as a range of normality using the past measured value stored in the measurement result storage unit 281 as the reference value. In FIG. 12, the voltage V11 corresponds to an example of the reference value, and the area A11 corresponds to an example of the range of normality.

Alternatively, the storage unit 280 may store the range of normality in advance.

When the anomaly determination unit 291 determines that the measured value deviates from the range of normality, the anomaly determination unit 291 causes the display unit 230 to display an alarm according to a type of the measured value.

In the example of FIG. 12, a measured voltage value of the voltage measurement unit 130 is within the range of normality until time T31. In FIG. 12, "within" the range of the area A11 corresponds to an example of "within" the range of normality. On the other hand, after time T31, the measured voltage value of the voltage measurement unit 130 deviates from the range of normality. Here, an anomaly in the power supply may be considered to be a cause of an increase in the measured voltage value of the voltage measurement unit 130, as in the example of FIG. 12.

Therefore, the storage unit 280 stores information indicating a correspondence relationship between a type of measured value indicating the anomaly and the cause of the anomaly in advance. When the anomaly determination unit 291 determines that there is an anomaly as a result of comparing the measured value with a threshold value, the anomaly determination unit 291 causes the display unit 230 to display an alarm according to the cause of the anomaly on the basis of the information stored in the storage unit 280.

In the case of the example of FIG. 12, when the anomaly determination unit 291 determines that the measured voltage value is greater than a threshold value defined as an upper limit of a normal value at a certain time after time T31, the anomaly determination unit 291 causes the display unit 230 to display an alarm indicating an anomaly in the power supply and prompt inspection on the basis of the information stored in the storage unit 280.

It should be noted that, in FIG. 12, the description has been given in an example of the voltage measured by the voltage measurement unit 130, a target in which the anomaly determination unit 291 determines whether or not there is the anomaly on the basis of the threshold value is not limited to the voltage. For any one of the changeover force measured by the changeover force measurement unit 110, the current measured by the current measurement unit 120, the voltage measured by the voltage measurement unit 130, the displacement measured by the displacement measurement unit 140, and the temperature measured by the driving device temperature measurement unit 150 or a combination thereof, the anomaly determination unit 291 may determine whether or not there is an anomaly on the basis of the threshold value.

Figure 13:
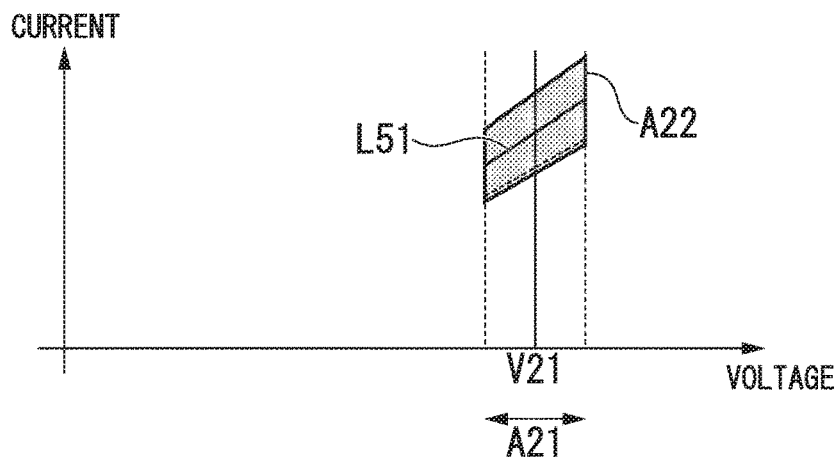
FIG. 13 is a graph showing an example in which the anomaly determination unit according to the embodiment of the present invention determines whether or not there is an anomaly by comparing two types of measured values with a threshold value.

FIG. 13 is a graph showing an example in which the anomaly determination unit 291 determines whether or not there is an anomaly by comparing two types of measured values with a threshold value. In FIG. 13, a horizontal axis indicates a voltage and a vertical axis indicates a current.

Further, a voltage V21 in FIG. 13 indicates a reference value of the voltage measured by the voltage measurement unit 130, and an area A21 including the voltage V21 indicates a range in which the anomaly determination unit 291 determines that the voltage is normal. A line L51 indicates a reference value of the current determined using a relationship with the voltage, and an area A22 that is within the range of the area A21 and includes the line L51 indicates a range in which the anomaly determination unit 291 determines the normality.

As described with reference to FIG. 11, the anomaly determination unit 291 may uses the past measured value stored in the measurement result storage unit 281 as a reference value and set a predetermined range from the reference value as a range in which the first measured value is normal. In FIG. 13, the voltage V21 corresponds to an example of the reference value. The area A21 corresponds to an example of the range in which the first measured value is normal.

Alternatively, the storage unit 280 may store the range in which the measured value is normal in advance.

Further, the storage unit 280 stores information indicating a relationship between the first measured value and a second measured value and the reference value in advance. The anomaly determination unit 291 obtains a reference value of the second measured value with respect to the range in which the first measured value is normal, and determines a predetermined range from the obtained reference value to be a range in which a combination of the first measured value and the second measured value is normal. In FIG. 13, the line L51 corresponds to an example of the reference value of the second measured value. The area A22 corresponds to an example of the range in which the combination of the first measured value and the second measured value is normal.

Alternatively, the storage unit 280 may store information indicating the range in which the combination of the first measured value and the second measured value is normal in advance.

Thus, the anomaly determination unit 291 can perform a more accurate determination by performing the anomaly determination on the basis of a combination of a plurality of types of measured values.

For example, when there is an anomaly in a power supply voltage that is supplied to the driving device 841, it is conceivable that the anomaly occurs in the current flowing through the driving device 841 even when there is no anomaly in the driving device 841 itself.

In this case, when the anomaly determination unit 291 determines that there is an anomaly on the basis of only the current measured by the current measurement unit 120, the anomaly determination unit 291 determines that there is an anomaly inside the driving device 841 from the detection of the anomaly in the current. In this case, although there is no anomaly in the driving device 841 itself, the anomaly determination unit 291 erroneously determines that there is an anomaly in the driving device 841.

On the other hand, in the example of FIG. 13, the anomaly determination unit 291 determines that there is an anomaly in the voltage and does not determine whether or not there is an anomaly in the current outside the range of the area A21, and determines that there is the anomaly in the current at the time of deviating from the area A22 within the range of the area A21. Accordingly, the anomaly determination unit 291 can avoid an erroneous determination that there is the anomaly in the inside of the driving device 841 due to the anomaly in the voltage even though there is no anomaly in the driving device 841 itself.

Further, a priority of the determination may be set for each type of measured value, and the anomaly determination unit 291 may determine whether or not there is an anomaly in an order from the measured value with the highest priority.

Figure 14:
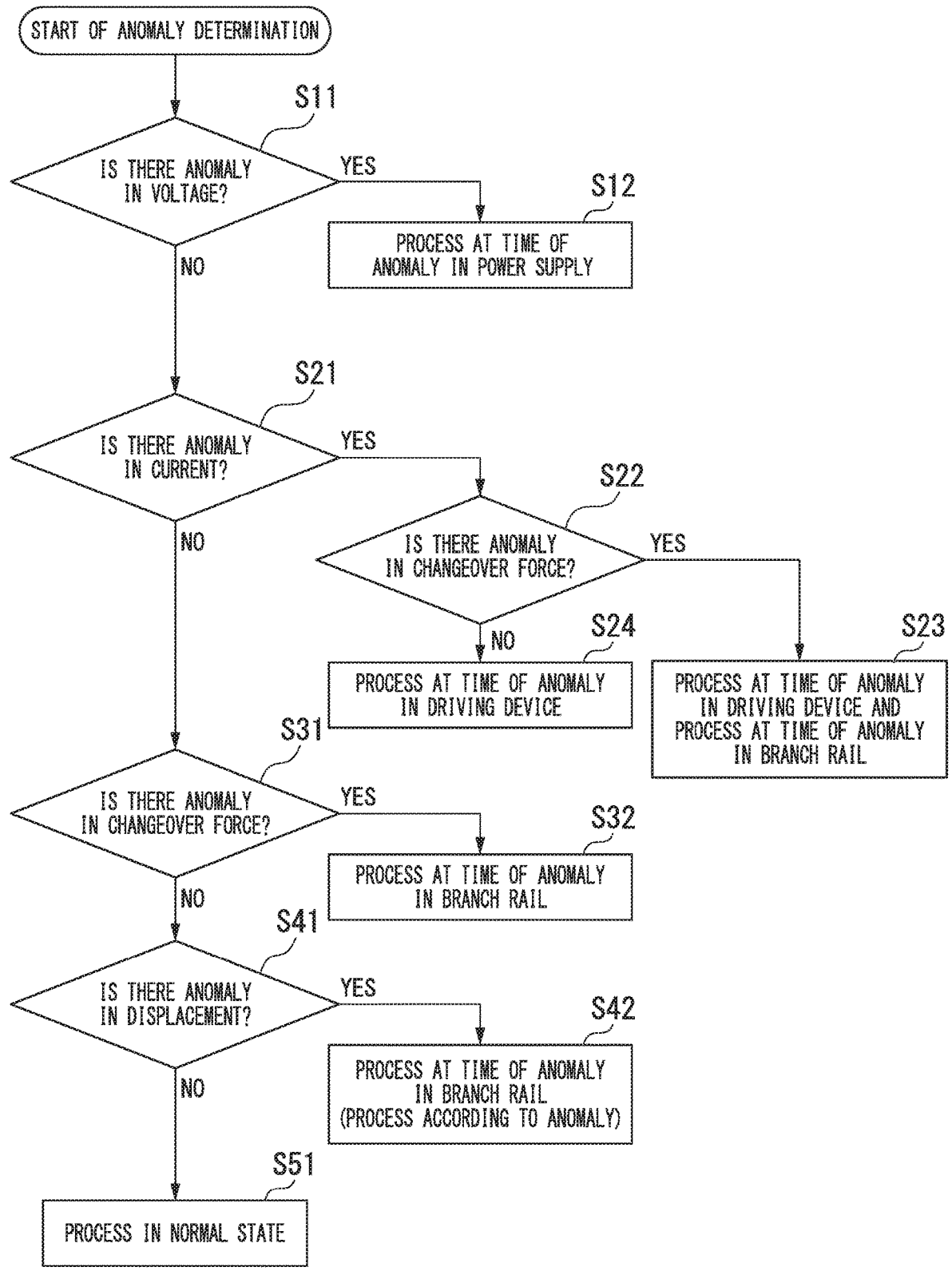
FIG. 14 is an illustrative diagram showing an example of an order in which the anomaly determination unit according to an embodiment of the present invention determines whether or not there is an anomaly.

FIG. 14 is an illustrative diagram showing an example of an order in which the anomaly determination unit 291 determines whether or not there is an anomaly. The anomaly determination unit 291 that has started an anomaly determination process first determines whether or not there is anomaly in voltage (step S11). Specifically, the anomaly determination unit 291 whether or not the measured voltage value by the voltage measurement unit 130 is within a predetermined range of normality.

When the anomaly determination unit 291 determines that there is an anomaly in voltage (step S11: YES), the anomaly determination unit 291 performs a process at the time of failure of the power supply (step S12). For example, the anomaly determination unit 291 causes the display unit 230 to display a message indicating that the anomaly occurrence place is estimated to be the power supply and that there is a possibility of failure of the power supply. The message herein corresponds to the alarm described above.

After step S12, the process of FIG. 14 ends.

On the other hand, when the anomaly determination unit 291 determines in step S11 that there is no anomaly in voltage (step S11: NO), the anomaly determination unit 291 determines whether or not there is an anomaly in current (step S21). Specifically, the anomaly determination unit 291 determines whether or not the current measured value by the current measurement unit 120 is within a predetermined range of normality.

Thus, the anomaly determination unit 291 determines whether or not there is an anomaly in the voltage. When the anomaly determination unit 291 determines that there is an anomaly in the voltage, the anomaly determination unit 291 determines whether or not there is an anomaly in the current. Therefore, when the anomaly determination unit 291 determines whether or not there is the anomaly in current, it can be assumed that the power supply is normal. Thus, when the anomaly determination unit 291 determines that there is an anomaly in the current, the anomaly determination unit 291 can exclude the power supply from a candidate for the anomaly occurrence place.

When the anomaly determination unit 291 determines in step S21 that there is an anomaly in the current (step S21: YES), the anomaly determination unit 291 determines whether or not there is an anomaly in the changeover force (step S22). Specifically, the anomaly determination unit 291 determines whether or not the magnitude of the changeover force measured by the changeover force measurement unit 110 is greater than a predetermined threshold value.

When the anomaly determination unit 291 determines there is an anomaly in the changeover force (step S22: YES), the anomaly determination unit 291 performs a process at the time of the driving device being abnormal and a process at the time of the variable branch rail being abnormal (step S23). Specifically, the anomaly determination unit 291 causes the display unit 230 to display a message indicating that the anomaly occurrence place is estimated to be the driving device on the basis of a determination result of the presence of the anomaly in the current in step S21 and there is a possibility of failure in the driving device such as disconnection or contact failure in the driving device. Further, the anomaly determination unit 291 causes the display unit 230 to display a message indicating that the anomaly occurrence place is estimated to be the variable branch rail on the basis of the determination result that there is an anomaly in the changeover force in step S22 and there is a possibility of the variable branch rail being stiff due to rust, freezing, or the like. After step S23, the process of FIG. 14 ends.

On the other hand, when the anomaly determination unit 291 determines in step S22 that there is no anomaly in the changeover force (step S22: NO), the anomaly determination unit 291 performs a process at the time of the driving device being abnormal (step S24). Specifically, the anomaly determination unit 291 causes the display unit 230 to display a message indicating that the anomaly occurrence place is estimated to be the driving device on the basis of the determination result of the presence of the anomaly in the current in step S21 and there is a possibility of failure in the driving device such as disconnection or contact failure in the driving device.

After step S24, the process of FIG. 14 ends.

On the other hand, when the anomaly determination unit 291 determines in step S21 that there is no anomaly in the current (step S21: NO), the anomaly determination unit 291 determines whether or not there is an anomaly in the changeover force (step S31). Specifically, the anomaly determination unit 291 determines whether or not the magnitude of the changeover force measured by the changeover force measurement unit 110 is greater than a predetermined threshold value.

When the anomaly determination unit 291 determines that there is an anomaly in the changeover force (step S31: YES), the anomaly determination unit 291 performs a process at the time of the branch rail being abnormal (step S32). Specifically, the anomaly determination unit 291 causes a message indicating that the anomaly occurrence place is estimated to be the variable branch rail and there is a possibility that the variable branch rail is stiff due to rust, freezing, or the like to display on the display unit 230.

After step S32, the process of FIG. 14 ends.

On the other hand, when the anomaly determination unit 291 determines in step S31 that there is no anomaly in the changeover force (step S31: NO), the anomaly determination unit 291 determines whether or not there is an anomaly in the displacement (step S41). Specifically, the anomaly determination unit 291 determines whether or not there is the anomaly described with reference to FIG. 10 on the basis of the measured value of the displacement measured by the displacement measurement unit 140.

When the anomaly determination unit 291 determines that there is an anomaly in the displacement (step S41: YES), the anomaly determination unit 291 performs a process according to the anomaly determined in step S41 (step S42).

Specifically, when the displacement measured by the displacement measurement unit 140 is smaller than the predetermined the amount of displacement, the anomaly determination unit 291 causes the display unit 230 to display a message indicating that the anomaly occurrence place is estimated to be the variable branch rail 832 and there is a possibility of the displacement being insufficient due to a foreign object caught in the variable branch rail 832.

Further, when the amounts of left and right displacements are different, the anomaly determination unit 291 causes the display unit 230 to display a message indicating that the anomaly occurrence place is estimated to be the variable branch rail 832 and there is a possibility of engagement between the variable branch rail 832 and the rod 842 being loose.

Further, when the displacement measured by the displacement measurement unit 140 has an offset equal to or greater than a predetermined threshold value, the anomaly determination unit 291 causes the display unit 230 to display a message indicating that the anomaly occurrence place is estimated to be the variable branch rail 832 and there is a possibility of the variable branch rail 832 or the rod 842 being deformed.

After step S42, the process of FIG. 14 ends.

On the other hand, when it is determined that there is no anomaly in step S41 (step S41: NO), the anomaly determination unit 291 performs a process at the time of a normal state (step S51). For example, the anomaly determination unit 291 causes the display unit 230 to display a message indicating that no anomaly has been found. Alternatively, in step S51, the anomaly determination unit 291, particularly, may not perform any process.

After step S51, the process of FIG. 14 ends.

It should be noted that the anomaly determination unit 291 may determine whether or not there is the tendency of anomaly using the history of the measured values stored in the measurement result storage unit 281. This point will be described with reference to FIGS. 15 and 16.

Figure 15:
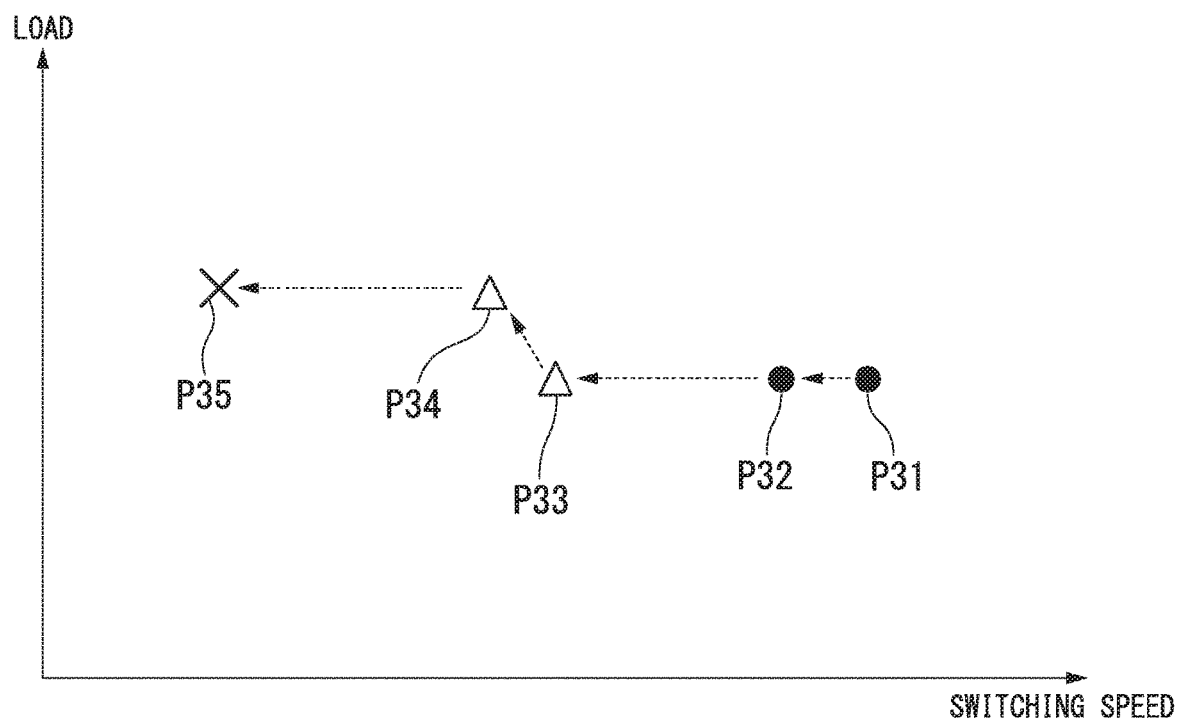
FIG. 15 is a graph showing a first example of a history of measured values indicating a tendency of anomalies in an embodiment of the present invention.

FIG. 15 is a graph showing a first example of the history of measured values showing a tendency of the anomaly.

In the graph of FIG. 15, a horizontal axis indicates a switching speed of the variable branch rail 832, and a vertical axis indicates a load. Points P31 to P35 indicate average values of the switching speed in one changeover of the variable branch rail 832 and an average value of a load applied to the rod 842 at the time of changeover. For example, each time the changeover of the variable branch rail 832 is performed, the anomaly determination unit 291 obtains the average value of the switching speed in changeover and an average value of the load applied to the rod 842. The anomaly determination unit 291 stores the average value in the measurement result storage unit 281 in association with information indicating a timing at which the changeover has been performed (for example, information indicating a date and time when the changeover has been started).

A time when the changeover of the variable branch rail 832 has been performed is in an order of the points P31, P32, P33, . . . , P35. The changeover indicated by the point P31 is the oldest, and the changeover indicated by a point P35 is the newest. In FIG. 15, this order in time series is indicated by a broken line arrow.

In the example of FIG. 15, the anomaly determination unit 291 obtains a difference (amount of change) in the switching speed and a difference in the load for changeovers adjacent in time series. When the anomaly determination unit 291 determines that at least one of a decrease in the switching speed being greater than a predetermined threshold value and an increase in the load being greater than a predetermined threshold value occurs, the anomaly determination unit 291 determines that the tendency of the anomaly has been detected.

When the tendency of anomaly has been detected, the anomaly determination unit 291 causes the display unit 230 to display a message for prompting attention in first detection. Further, in second detection of the tendency of the anomaly, the anomaly determination unit 291 causes the display unit 230 to display a message for prompting inspection. The anomaly determination unit 291 performs these processes irrespective of whether the measured value itself exceeds the threshold value for an anomaly determination.

In the case of the example of FIG. 15, between the point P31 and the point P32, both the decrease in the switching speed and the increase in the load are within a threshold value range, and the anomaly determination unit 291 determines that the anomaly is normal. In FIG. 15, a determination result of normality is indicated by a circle.

On the other hand, between the point P32 and the point P33, the decrease in the switching speed is greater than the threshold value. Therefore, the anomaly determination unit 291 determines that attention is required. The determination that the attention is required in this case is a determination causing the display unit 230 to display a message urging attention. In FIG. 15, the determination result of the attention being required is indicated by a triangle.

Between the point P33 and the point P34, both the decrease in the switching speed and the increase in the load are within the threshold value range, and the anomaly determination unit 291 maintains the determination of the attention being required. On the other hand, between the point P34 and the point P35, the decrease in the switching speed is greater than the threshold value. Therefore, the anomaly determination unit 291 determines that the inspection is required. The determination of the inspection being required is a determination causing the display unit 230 to display a message for prompting inspection. In FIG. 15, the determination result of the inspection being required is indicated by a cross mark.

Figure 16:
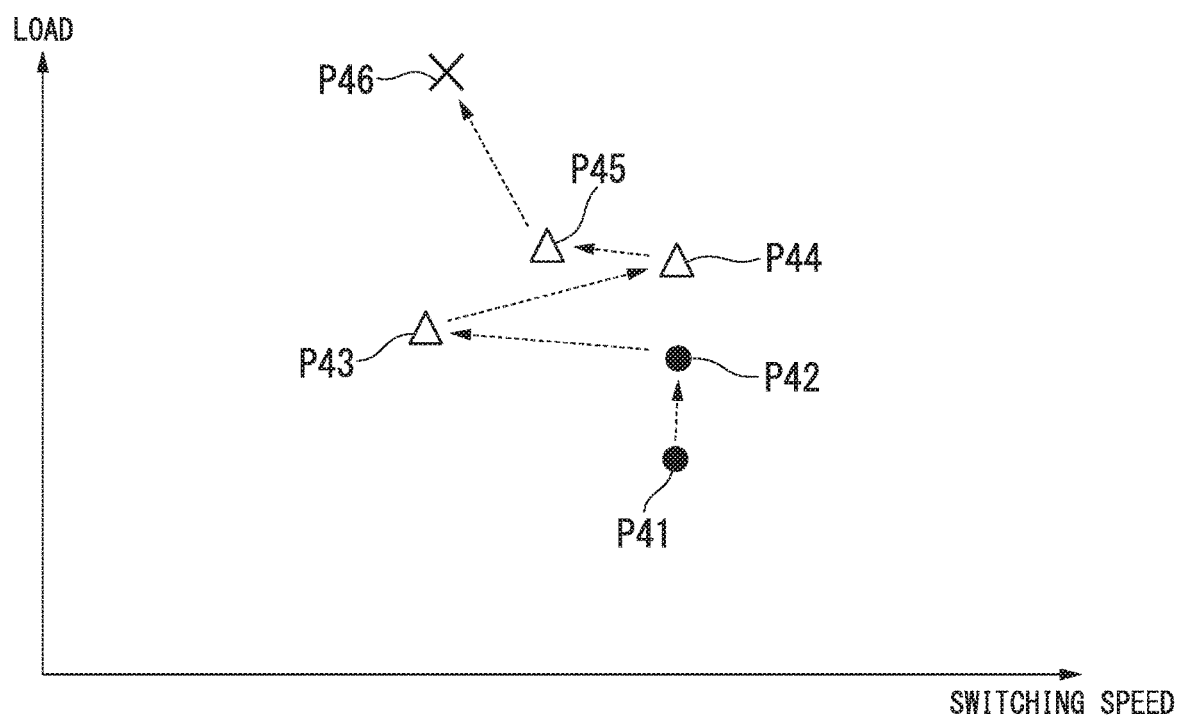
FIG. 16 is a graph showing a second example of a history of measured values indicating a tendency of anomalies in an embodiment of the present invention.

FIG. 16 is a graph showing a second example of the history of measured values showing a tendency of the anomaly.

In the graph of FIG. 16, a horizontal axis indicates a switching speed of the variable branch rail 832, and a vertical axis indicates a load. Points P41 to P46 indicate average values of the switching speed in one changeover of the variable branch rail 832 and an average value of a load applied to the rod 842 at the time of changeover. For example, each time the changeover of the variable branch rail 832 is performed, the anomaly determination unit 291 obtains the average value of the switching speed in changeover and an average value of the load applied to the rod 842. The anomaly determination unit 291 stores the average value in the measurement result storage unit 281 in association with information indicating a timing at which the changeover has been performed (for example, information indicating a date and time when the changeover has been started).

A time when the changeover of the variable branch rail 832 is performed is in an order of the points P41, P42, P43, . . . , P46. The changeover indicated by the point 41 is the oldest, and the changeover indicated by the point P46 is the newest. In FIG. 16, the order in time series is indicated by a broken line arrow.

A method of detecting the tendency of anomaly in the anomaly determination unit 291 and the process when the anomaly has been detected are the same as those described with reference to FIG. 15.

In the case of the example of FIG. 16, between the point P41 and the point P42, both the decrease in the switching speed and the increase in the load are within the threshold value range, and the anomaly determination unit 291 determines normality. In FIG. 16, a determination result of being normal is indicated by a circle.

On the other hand, between the point P42 and the point P43, the decrease in the switching speed is greater than the threshold value. Therefore, the anomaly determination unit 291 determines that attention is required. In FIG. 16, the determination result of the attention is required is indicated by a triangle.

Between the point P43 and the point P44, both the decrease in the switching speed and the increase in the load are within the threshold value range, and the anomaly determination unit 291 maintains the determination of the attention being required. The same applies to between the point P44 and the point P45.

On the other hand, between the point P45 and the point P46, the increase in the load is greater than the threshold value. Therefore, the anomaly determination unit 291 determines that the inspection is required. In FIG. 16, the determination result of the inspection being required is indicated by a cross mark.

As described with reference to FIGS. 15 and 16, the anomaly determination unit 291 detects the tendency of anomaly and notifies the user irrespective of whether the measured value itself exceeds the threshold value for an anomaly determination, such that the user can recognize a possibility of occurrence of failure such as malfunction at a relatively early stage. Thus, the user can take countermeasures with a time margin. Further, there is a possibility of the user being able to prevent the occurrence of troubles or the like in advance.

Next, an operation of the anomaly determination device 1 will be described with reference to FIG. 17.

Figure 17:
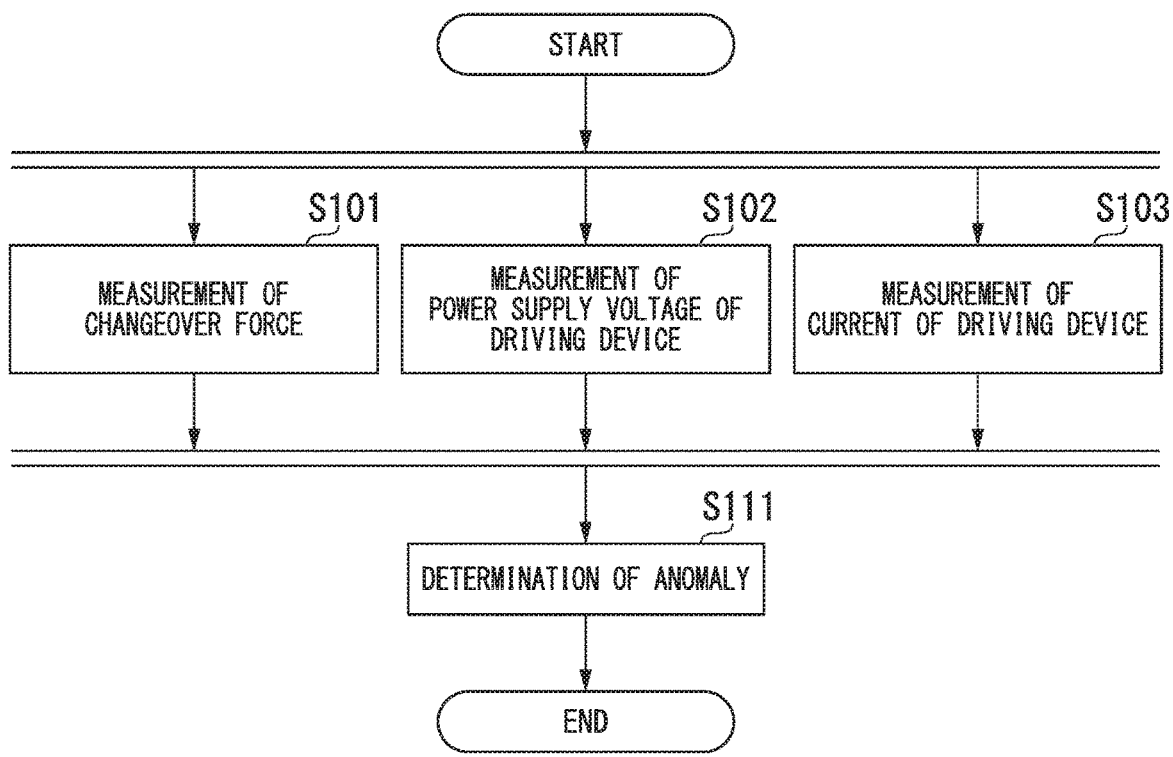
FIG. 17 is a flowchart showing an example of a processing procedure in which the anomaly determination device according to an embodiment of the present invention performs a determination of an anomaly regarding a branching device.

FIG. 17 is a flowchart showing an example of a processing procedure in which the anomaly determination device 1 performs an anomaly determination regarding the branching device 840. The anomaly determination device 1, for example, periodically performs a process of FIG. 17.

In the process of FIG. 17, the changeover force measurement unit 110 measures a changeover force with which the branching device 840 switches the direction of the variable branch rail 832 (step S101). Further, the voltage measurement unit 130 measures a power supply voltage that is be supplied to the driving device 841 (step S102). The current measurement unit 120 measures a current flowing through the driving device 841 (step S103).

An execution order of steps S101 to S103 may be arbitrary. For example, the anomaly determination device 1 may perform step S101, step S102, and step S103 in a parallel process.

When the processes of steps S101 to S103 end, the anomaly determination unit 291 determines whether or not there is an anomaly regarding the branching device 840 (step S111). The anomaly determination unit 291 determines whether or not there is an anomaly regarding the branching device 840 on the basis of a measured value of the changeover force obtained in step S101, a measured value of the voltage obtained in step S102, and a measured value of the current obtained in step S103. Here, for example, as described with reference to FIG. 10, the anomaly determination unit 291 separately determines whether or not there is an anomaly in the branching device 840, there is an anomaly in the branch rail 830, there is an anomaly in the driving device 841, and there is an anomaly in the power supplied to the driving device 841.

After step S111, the processing of FIG. 17 ends.

As described above, the changeover force measurement unit 110 measures the changeover force that is output by the driving device 841. Further, the voltage measurement unit 130 measures the voltage that is supplied to the driving device 841. The current measurement unit 120 measures the current flowing through the driving device. The anomaly determination unit 291 determines whether or not there is an anomaly in the branch rail 830, there is an anomaly in the driving device 841, and there is an anomaly in the supply of power to the driving device 841 on the basis of the measured value of the changeover force, the measured value of the voltage, and the measured value of the current.

Thus, since the anomaly determination unit 291 separates the anomaly occurrence places to determine whether or not there is an anomaly, the user can obtain information for recognizing a failure occurrence place when a failure has occurred in a switching portion of the track. Accordingly, it is expected that the user can rapidly specify the failure occurrence place. The user can rapidly resolve the failure by rapidly specifying the failure occurrence place.

Further, the displacement measurement unit 140 measures the displacement of the branch rail 830 (displacement of the variable branch rail 832) provided on each of the left and right sides of the travel route of the vehicle 900 along the travel route, for each of the right and left branch rails 830. The anomaly determination unit 291 determines whether or not there is an anomaly in the branch rail 830 on the basis of a difference between the displacement of the left branch rail 830 and the displacement of the right branch rail 830. Thus, the anomaly determination unit 291 can perform classification of abnormalities in more detail. For example, the anomaly determination unit 291 detects a possibility of loose engagement between the variable branch rail 832 and the rod 842.

Further, the anomaly determination unit 291 determines whether or not there is an anomaly on the basis of a temporal change of at least one of the measured value of the changeover force, the measured value of the voltage, and the measured value of the current. The anomaly determination unit 291 can set the threshold value for an anomaly determination on the basis of a past measured value to set a threshold value according to an individual difference of the device. Using this threshold value, the anomaly determination unit 291 can determine whether or not there is an anomaly with higher accuracy.

Further, the anomaly determination unit 291 detects the tendency of the anomaly on the basis of the amount of change in the measured value and notifies the user of the tendency of anomaly, such that the user can recognize a possibility of occurrence of failure such as failure in a relatively early stage. Thus, the user can take countermeasures with a time margin. Further, there is a possibility of the user being able to prevent the occurrence of failure or the like in advance.

It should be noted that the process of each unit may be performed by recording a program for realizing all or some of the functions of the control unit 290 in a computer-readable recording medium, loading the program recorded on the recording medium to a computer system, and executing the program. It should be noted that the "computer system" described herein includes an OS or hardware such as a peripheral device.

Further, the "computer-readable recording medium" includes a portable medium such as a flexible disk, a magneto-optical disc, a ROM, or a CD-ROM, or a storage device such as a hard disk built in the computer system.

Further, the above program may be a program for realizing some of the above-described functions. Alternatively, the program may be a program capable of realizing the above-described functions in combination with a program previously stored in a computer system.

Although the embodiment of the present invention has been described above in detail with reference to the drawings, specific configurations are not limited to this embodiment, and design changes and the like within the scope not departing from the gist of the present invention are included.

INDUSTRIAL APPLICABILITY

The embodiment of the present invention relates to the anomaly determination device that determines whether or not there is the anomaly regarding the branching device including the driving device that outputs the changeover force for switching the direction of the branch rail whose direction is variable, and the rod that transmits the changeover force from the driving device to the branch rail, wherein the anomaly determination device includes a changeover force measurement unit that measures the changeover force output by the driving device, the voltage measurement unit that measures the voltage supplied to the driving device, the current measurement unit that measures the current flowing through the driving device, and the anomaly determination unit that determines whether or not there is an anomaly in the branch rail, there is an anomaly in the driving device, and there is an anomaly in power supplied to the driving device on the basis of the magnitude of the changeover force, the magnitude of the voltage, and the magnitude of the current.

According to this embodiment, when a failure has occurred in the switching portion of the track, information for recognizing the failure occurrence place can be obtained.

REFERENCE SIGNS LIST

1 Anomaly determination device
100 Measurement unit
110 Changeover force measurement unit
120 Current measurement unit 130 Voltage measurement unit
140 Displacement measurement unit
150 Driving device temperature measurement unit
160 Environmental temperature measurement unit
200 Anomaly determination device body
210 Measurement result acquisition unit
220 Operation input unit
230 Display part
280 Storage unit
281 Measurement result storage unit
290 Control unit
291 Anomaly determination unit

The invention claimed is:

1. An anomaly determination device comprising:
 a changeover force measurement unit that measures a changeover force output by a driving device configured to output the changeover force for switching a direction of a branch rail which can be varied in direction;
 a voltage measurement unit that measures a voltage supplied to the driving device;
 a current measurement unit that measures a current flowing through the driving device; and
 an anomaly determination unit that individually determines an anomaly of the branch rail due to a variation of the changeover force, an anomaly of the driving device due to a variation of the current, or an anomaly of power supplied to the driving device due to an event when the current or the voltage is varied outside a range between an upper threshold and a lower threshold.

2. The anomaly determination device according to claim 1, further comprising a displacement measurement unit that measures displacements of the branch rails provided on left and right sides of a travel route of a vehicle along the travel route, for the respective left and right branch rails,
 wherein the anomaly determination unit determines an anomaly of the branch rails based on a difference between a displacement of the left branch rail and a displacement of the right branch rail.

3. The anomaly determination device according to claim 1, wherein the anomaly determination unit individually determines the anomaly of the branch rail responsive to a temporal change of the changeover force, the anomaly of the driving device response to a temporal change of the current, or the anomaly of power supplied to the driving device response to a temporal change of the voltage or the current.

4. An anomaly determination method comprising:
 measuring a changeover force output by a driving device configured to output the changeover force for switching a direction of a branch rail which can be varied in direction;
 measuring a voltage supplied to the driving device;
 measuring a current flowing through the driving device; and
 individually determining is an anomaly of the branch rail due to a variation of the changeover force, an anomaly of the driving device due to a variation of the current, or an anomaly in of power supplied to the driving device due to an event when the current or the voltage is varied outside a range between an upper threshold and a lower threshold.

5. A non-transitory computer-readable recording medium storing a program for causing a computer to individually determine is an anomaly of a branch rail due to a variation of a changeover force produced by the driving device to switch a direction of the branch rail, an anomaly of a driving device due to a variation of a current flowing through the driving device, or an anomaly of power supplied to the driving device due to an event when the current flowing through the driving device or the voltage supplied to the driving device is varied outside a range between an upper threshold and a lower threshold.

6. The anomaly determination device according to claim 1, wherein the anomaly determination unit is configured to individually determine the anomaly of the branch rail due to an increase of the changeover force or the anomaly of the driving device due to a decrease of the current.

7. The anomaly determination method according to claim 4, wherein the anomaly of the branch rail is determined due to an increase of the changeover force while the anomaly of the driving device is determined due to a decrease of the current.

* * * * *